United States Patent
Tsujii et al.

(10) Patent No.: US 7,702,220 B2
(45) Date of Patent: Apr. 20, 2010

(54) FILE RECORDING DEVICE, FILE REPRODUCTION DEVICE, FILE RECORDING METHOD, PROGRAM OF FILE RECORDING METHOD, RECORDING MEDIUM CONTAINING THEREIN PROGRAM OF FILE RECORDING METHOD, FILE REPRODUCING METHOD, PROGRAM OF FILE REPRODUCING METHOD, AND RECORDING MEDIUM CONTAINING THEREIN PROGRAM OF FILE REPRODUCING METHOD

(75) Inventors: Satoshi Tsujii, Tokyo (JP); Mitsuhiro Hirabayashi, Tokyo (JP); Fumitaka Kawate, Kanagawa (JP); Makoto Yamada, Tokyo (JP)

(73) Assignee: Sony Corporation, Tokyo (JP)

( * ) Notice: Subject to any disclaimer, the term of this patent is extended or adjusted under 35 U.S.C. 154(b) by 782 days.

(21) Appl. No.: 10/570,811

(22) PCT Filed: Jul. 27, 2004

(86) PCT No.: PCT/JP2004/011022

§ 371 (c)(1),
(2), (4) Date: Nov. 28, 2006

(87) PCT Pub. No.: WO2005/027133

PCT Pub. Date: Mar. 24, 2005

(65) Prior Publication Data

US 2007/0165998 A1 Jul. 19, 2007

(30) Foreign Application Priority Data

Sep. 9, 2003 (JP) ............................. 2003-316251

(51) Int. Cl.
*H04N 5/00* (2006.01)
*H04N 5/93* (2006.01)
(52) U.S. Cl. ........................................ 386/125; 386/52
(58) Field of Classification Search ................... 386/52, 386/55, 125, 124, 4, 46
See application file for complete search history.

(56) References Cited

U.S. PATENT DOCUMENTS

| 5,682,326 A | 10/1997 | Klingler et al. |
| 2003/0142954 A1 | 7/2003 | Kotani et al. |
| 2006/0008247 A1* | 1/2006 | Minami et al. ................. 386/52 |
| 2007/0263979 A1* | 11/2007 | Kihara et al. .................. 386/64 |

FOREIGN PATENT DOCUMENTS

EP    0 564 247 A1    10/1993

(Continued)

OTHER PUBLICATIONS

David Singer, "Quick Time File Format Specification, May 1996", Video Standards and Drafts, No. M2982, Jan. 20, 1998, XP030032255, pp. i-x, 1-88 and 6 index pages.

*Primary Examiner*—Robert Chevalier
(74) *Attorney, Agent, or Firm*—Oblon, Spivak, McClelland, Maier & Neustadt, L.L.P.

(57) ABSTRACT

A file recording apparatus receives input from a user in order to edit video data and to record a file based on a result of the edit. The file includes a block including management information, having at least a video track based on management information about the video data and an effect track based on management information about effects to be set for the video data in a hierarchical structure of management information for managing real data. The file also includes a block including real data, having at least real data associated with the effect track. The recording apparatus makes the effect track by setting a null effect having no advantage of the effect and an active effect having an advantage of the effect with regard to the video track, and makes the file by setting a source track as a target for the effect track to the video track.

19 Claims, 20 Drawing Sheets

FOREIGN PATENT DOCUMENTS

| | | |
|---|---|---|
| JP | 2002-21137 | 1/2000 |
| JP | 2000-295566 | 10/2000 |
| JP | 2002-232827 | 8/2002 |
| JP | 2002-290915 | 10/2002 |
| JP | 2003-168283 | 6/2003 |

* cited by examiner

FIG. 6

| ATOM | TYPE NAME |
|---|---|
| Movie atom { | 'moov' |
|    Movie Header atom | 'mvhd' |
|    Track atom (video) { | 'trak' |
|       Track Header atom | 'tkhd' |
|       Edit atom { | 'edts' |
|          Edit List atom | 'elst' |
|       } | |
|       Media atom { | 'mdia' |
|          Media Header atom | 'mdhd' |
|          Media Handler Reference atom | 'hdlr' |
|          Media Information atom { | 'minf' |
|             Video Media Information Header atom | 'vmhd' |
|             Data Handler Reference atom | 'hdlr' |
|             Data Information atom | 'dinf' |
|                Data Reference atom | 'dref' |
|             } | |
|             Sample Table atom | 'stbl' |
|                Sample Description atom | 'stsd' |
|                Time-to-Sample atom | 'stts' |
|                Sample Size atom | 'stsz' |
|                Sample-to-Chunk atom | 'stsc' |
|                Chunk Offset atom | 'stco' |
|             } | |
|          } | |
|       } | |
|    } | |
|    Track atom (effect) { | 'trak' |
|       Track Header atom | 'tkhd' |
|       Edit atom { | 'edts' |
|          Edit List atom | 'elst' |
|       } | |
|       Track Reference atom { | 'tref' |
|          Track Reference Type atom | 'ssrc' |
|       } | |
|       Media atom { | 'mdia' |
|          Media Header atom | 'mdhd' |
|          Media Handler Reference atom | 'hdlr' |
|          Media Information atom { | 'minf' |
|             Video Media Information Header atom | 'vmhd' |
|             Data Handler Reference atom | 'hdlr' |
|             Data Information atom { | 'dinf' |
|                Data Reference atom | 'dref' |

FIG. 7

```
        }
        Sample Table atom {                        'stbl'
            Sample Description atom               'stsd'
            Time-to-Sample atom                   'stts'
            Sample Size atom                      'stsz'
            Sample-to-Chunk atom                  'stsc'
            Chunk Offset atom                     'stco'
        }
    }
    Track Input Map atom {                        'imap'
        QTatom container {                        'sean'
            Track Input QTatom {                  ' in'
                Input Type QTatom                 ' ty'
                    Data Source Type QTatom       'dtst'
                }
            }
        }
    }
}
Movie Data atom                                   'mdat'
```

FIG. 8

| ATOM | TYPE NAME |
|---|---|
| Movie atom { | 'moov' |
|    Movie Header atom | 'mvhd' |
|    Track atom (video 1) { | 'trak' |
|       Track Header atom | 'tkhd' |
|       Edit atom { | 'edts' |
|          Edit List atom | 'elst' |
|       } | |
|       Media atom { | 'mdia' |
|          Media Header atom | 'mdhd' |
|          Media Handler Reference atom | 'hdlr' |
|          Media Information atom { | 'minf' |
|             Video Media Information Header atom | 'vmhd' |
|             Data Handler Reference atom | 'hdlr' |
|             Data Information atom | 'dinf' |
|                Data Reference atom | 'dref' |
|             } | |
|             Sample Table atom | 'stbl' |
|                Sample Description atom | 'stsd' |
|                Time-to-Sample atom | 'stts' |
|                Sample Size atom | 'stsz' |
|                Sample-to-Chunk atom | 'stsc' |
|                Chunk Offset atom | 'stco' |
|             } | |
|          } | |
|       } | |
|    } | |
| } | |

FIG.9

| | |
|---|---|
| Track atom (video 2) { | 'trak' |
|     Track Header atom | 'tkhd' |
|     Edit atom { | 'edts' |
|         Edit List atom | 'elst' |
|     } | |
|     Media atom { | 'mdia' |
|         Media Header atom | 'mdhd' |
|         Media Handler Reference atom | 'hdlr' |
|         Media Information atom { | 'minf' |
|             Video Media Information Header atom | 'vmhd' |
|             Data Handler Reference atom | 'hdlr' |
|             Data Information atom { | 'dinf' |
|                 Data Reference atom | 'dref' |
|             } | |
|             Sample Table atom { | 'stbl' |
|                 Sample Description atom | 'stsd' |
|                 Time-to-Sample atom | 'stts' |
|                 Sample Size atom | 'stsz' |
|                 Sample-to-Chunk atom | 'stsc' |
|                 Chunk Offset atom | 'stco' |
|             } | |
|         } | |
|     } | |
| } | |
| Track atom (effect) { | 'trak' |
|     Track Header atom | 'tkhd' |
|     Edit atom { | 'edts' |
|         Edit List atom | 'elst' |
|     } | |
|     Track Reference atom { | 'tref' |
|         Track Reference Type atom | 'ssrc' |
|     } | |
|     Media atom { | 'mdia' |
|         Media Header atom | 'mdhd' |
|         Media Handler Reference atom | 'hdlr' |
|         Media Information atom { | 'minf' |
|             Video Media Information Header atom | 'vmhd' |
|             Data Handler Reference atom | 'hdlr' |
|             Data Information atom { | 'dinf' |
|                 Data Reference atom | 'dref' |

FIG.10

```
        }
        Sample Table atom {                    'stbl'
            Sample Description atom            'stsd'
            Time-to-Sample atom                'stts'
            Sample Size atom                   'stsz'
            Sample-to-Chunk atom               'stsc'
            Chunk Offset atom                  'stco'
        }
    }
    Track Input Map atom {                     'imap'
        QTatom container {                     'sean'
            Track Input QTatom {               ' in'
                Input Type QTatom              ' ty'
                Data Source Type QTatom        'dtst'
            }
            Track Input QTatom {               ' in'
                Input Type QTatom              ' ty'
                Data Source Type QTatom        'dtst'
            }
        }
       }
      }
     }
    }
}
Movie Data atom                                'mdat'
```

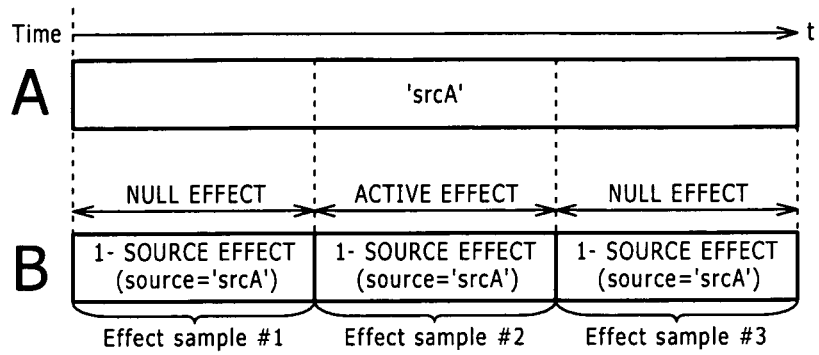
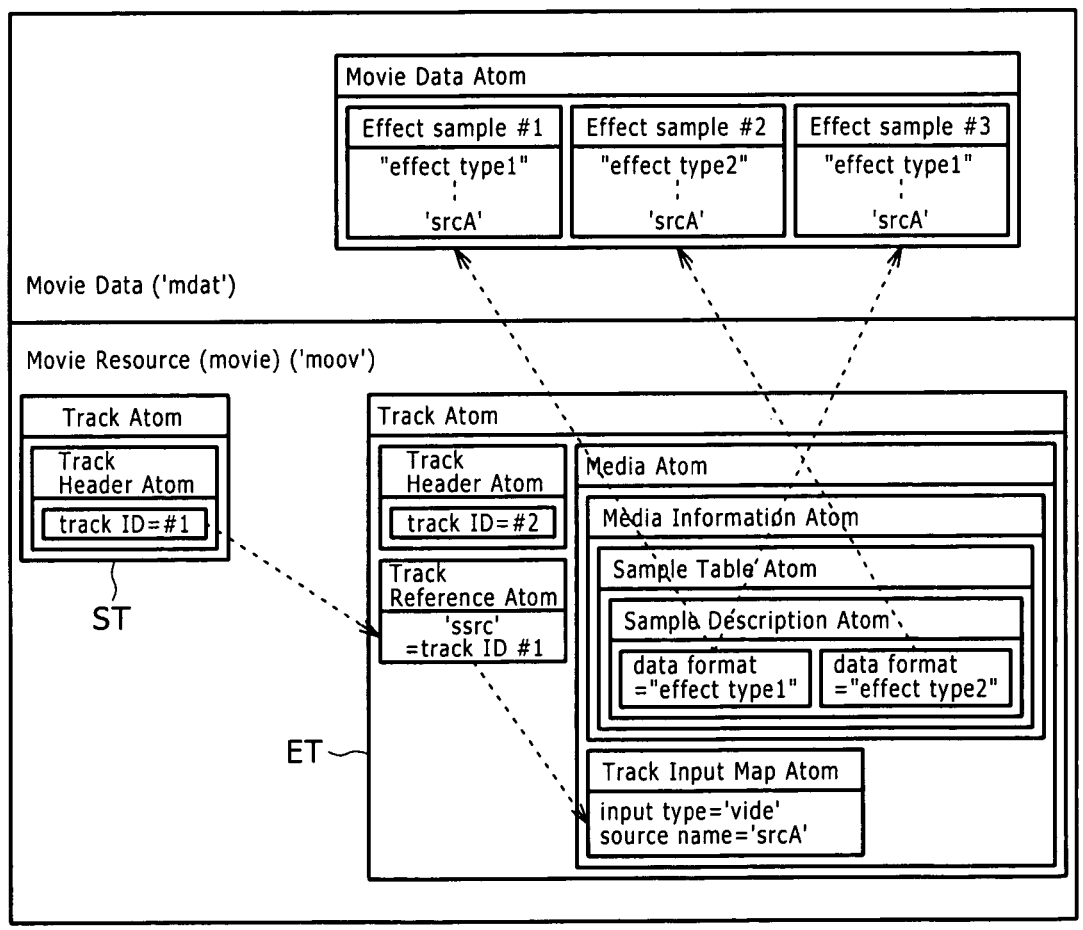

FIG. 12A
FIG. 12B
FIG. 12C
FIG. 12D
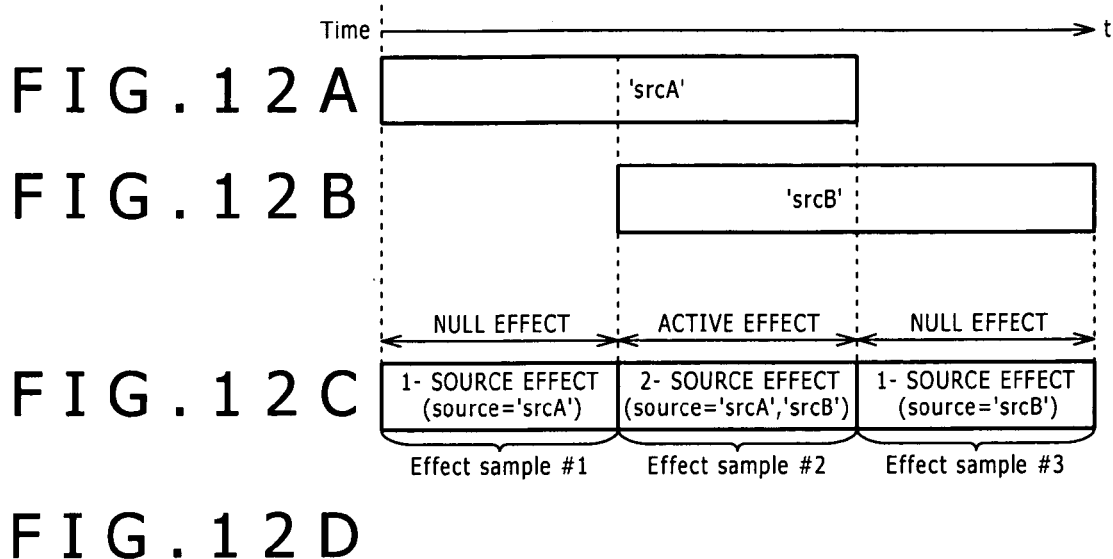
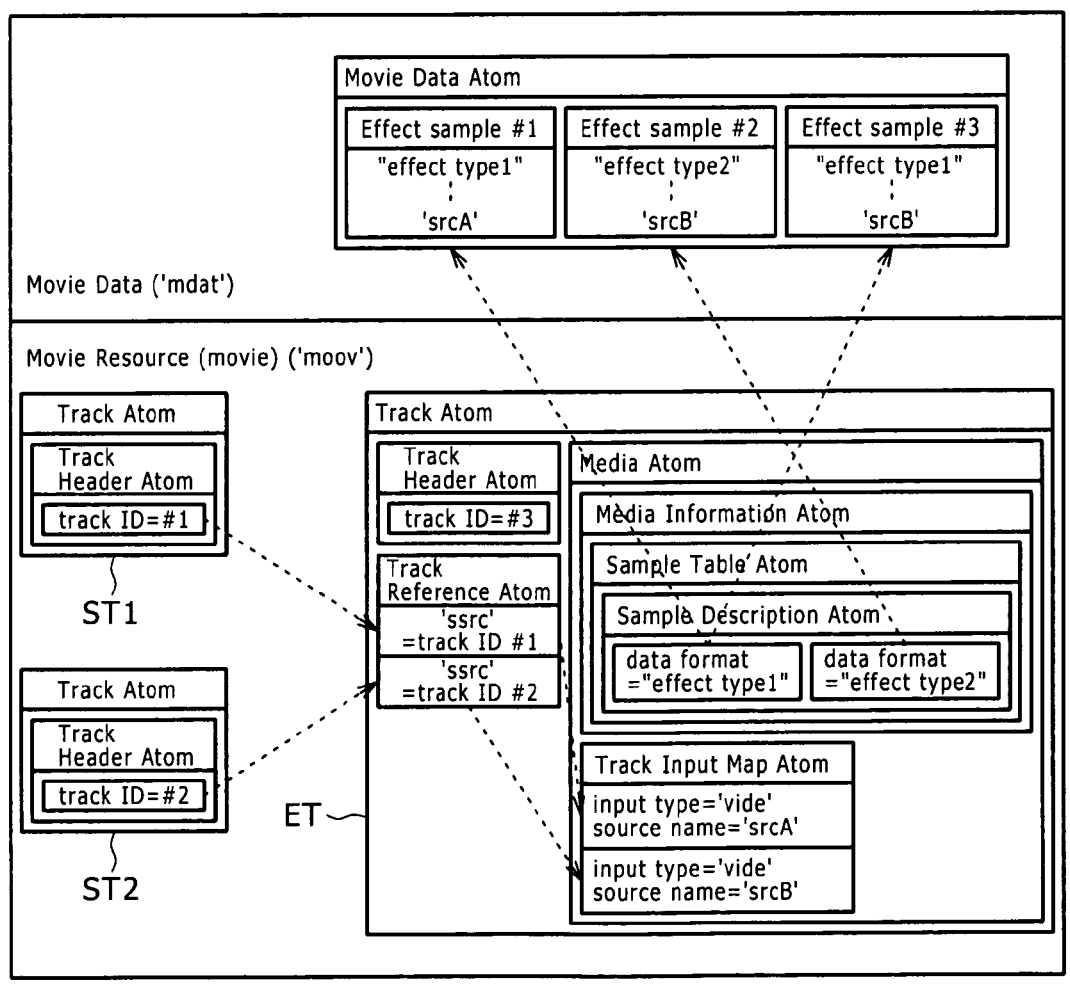

FIG. 13

```
Sample Description atom {
    (4) Size
    (4) Type(='stsd')
    (1) Version
    (3) Flags
    (4) Number of Entries
    (86) Video Sample Description entry#1
              :
    (86) Video Sample Description entry#M
}
    Video Sample Description entry {
        (4) Size
        (4) Data Format
        (6) Reserved
        (2) Data Reference Index
        (2) Version
        (2) Revision Level
        (4) Vendor
        (4) Temporal Quality
        (4) Spatial Quality
        (2) Width
        (2) Height
        (4) Horizontal Resolution
        (4) Vertical Resolution
        (4) Data Size
        (2) Frame Count
        (32) Compressor Name
        (2) Depth
        (2) Color Table ID
    }
```

FIG. 14

```
Sample Description atom {
    (4) Size
    (4) Type(='stsd')
    (1) Version
    (3) Flags
    (4) Number of Entries
    (112) Effect Sample Description entry#1
                    :
    (112) Effect Sample Description entry#M
}

Effect Sample Description entry {
        (4) Size
        (4) Data Format
        (6) Reserved
        (2) Data Reference Index
        (2) Version
        (2) Revision Level
        (4) Vendor
        (4) Temporal Quality
        (4) Spatial Quality
        (2) Width
        (2) Height
        (4) Horizontal Resolution
        (4) Vertical Resolution
        (4) Data Size
        (2) Frame Count
        (32) Compressor Name
        (2) Depth
        (2) Color Table ID
/* Data Format extension atom */
        (26) Stream Descriptor atom
    }
```

FIG. 15

| TYPE NAME | EFFECT NAME |
|---|---|
| 'blur' | BLUR |
| 'solr' | COLOR STYLE |
| 'tint' | COLOR TINT |
| 'edge' | EDGE DETECTION |
| 'embs' | EMBOSS |
| 'hslb' | HSL COLOR BALANCE |
| 'rgbb' | RGB COLOR BALANCE |
| 'shrp' | SHARPEN |
| 'YPST' | POSTERIZATION |
| 'MOSA' | MOSAIC |
| 'NEGA' | RGB REVERSE (NEGATIVE) |
| 'brco' | BRIGHTNESS AND CONTRAST |
| 'ckey' | CHROMA KEY |
| 'dslv' | CROSS FADE |
| 'push' | PUSH |
| 'slid' | SLIDE |
| 'RDOT' | RANDOM DOT |
| 'blnd' | ALPHA BLEND |
| 'zoom' | ZOOM |
| 'smpt' | SMPTE WIPE |
| 'smp2' | SMPTE IRIS |
| 'smp3' | SMPTE RADIAL |
| 'smp4' | SMPTE MATRIX |
| 'UDEF' | USER-DEFINED EFFECT |

FIG.16

```
Stream Descriptor atom {
    (4) Size
    (4) Type(='strd')
    (1) Version
    (3) Flags
    /* Data Format specific data */
    (4) Data Format
    (4) User Defined Effect Type
    (2) Parameter Flag
}
```

FIG.17

```
User Defined Effect Type {
    (2) Owner ID
    (2) Effect ID
}
```

FIG.18

| BIT | FLAG NAME | VALUE | DESCRIPTION |
|---|---|---|---|
| 15:1 | reserved | 0 | |
| 0 | Effect presentation effectiveness | 1 | EFFECTS BY APPLICABLE EFFECT SAMPLE ENTRY (ACTIVE EFFECTS) : VALID |
| | | 0 | EFFECTS BY APPLICABLE EFFECT SAMPLE ENTRY (ACTIVE EFFECTS) : INVALID |

FIG.19

| EFFECT NAME (TYPE NAME) | PARAMETER | TYPE NAME |
|---|---|---|
| Blur filter ('blur') | Amount of blurring | 'ksiz' |
| Color Style ('solr') | Solarize amount<br>Solarize point<br>Posterize amount | 'solr'<br>'solp'<br>'post' |
| Color Tint filter ('tint') | Tint<br>Dark color<br>Light color<br>Brightness<br>Contrast<br>Amount | 'tint'<br>'back'<br>'fore'<br>'brig'<br>'cont'<br>'amnt' |
| Edge detection filter ('edge') | Edge thickness<br>Colorize | 'ksiz'<br>'colz' |
| Emboss filter ('embs') | Amount of embossing | 'ksiz' |
| HSL Balance filter ('hslb') | Hue multiplier<br>Saturation multiplier<br>Lightness multiplier | 'hmul'<br>'smul'<br>'vmul' |
| RGB Balance filter ('rgbb') | Red multiplier<br>Green multiplier<br>Blue multiplier | 'rmul'<br>'gmul'<br>'bmul' |
| Sharpen filter ('shrp') | Amount of sharpening | 'ksiz' |
| Posterization ('YPST') | Y-bit adjustment | 'YBIT' |
| Mosaic ('MOSA') | Horizontal size<br>Vertical size<br>Amount | 'MHSZ'<br>'MVSZ'<br>'amnt' |
| RGB Reverse ('NEGA') | none | none |
| Brightness and Contrast ('brco') | Brightness<br>Contrast | 'bryt'<br>'cntr' |
| SMPTE WIpe effects ('smpt') | Percentage<br>Wipe ID<br>Soft border<br>Border width<br>Border color<br>Horizontal repeat<br>Vertical repeat | 'pcnt'<br>'wpID'<br>'soft'<br>'widt'<br>'bclr'<br>'hori'<br>'vert' |

FIG.20

| | | |
|---|---|---|
| SMPTE Iris effects ('smp2') | Percentage<br>Wipe ID<br>Soft border<br>Border width<br>Border color<br>Horizontal repeat<br>Vertical repeat | 'pcnt'<br>'wpID'<br>'soft'<br>'widt'<br>'bclr'<br>'hori'<br>'vert' |
| SMPTE Radial effects ('smp3') | Percentage<br>Wipe ID<br>Soft border<br>Border width<br>Border color<br>Horizontal repeat<br>Vertical repeat | 'pcnt'<br>'wpID'<br>'soft'<br>'widt'<br>'bclr'<br>'hori'<br>'vert' |
| SMPTE Matrix effects ('smp4') | Percentage<br>Wipe ID<br>Soft border<br>Border width<br>Border color<br>Horizontal repeat<br>Vertical repeat | 'pcnt'<br>'wpID'<br>'soft'<br>'widt'<br>'bclr'<br>'hori'<br>'vert' |
| Chroma Key ('ckey') | Key color | 'keyc' |
| Cross Fade ('dslv') | Percentage | 'pcnt' |
| Push ('push') | Percentage<br>From direction | 'pcnt'<br>'from' |
| Slide ('slid') | Percentage<br>Slide angle | 'pcnt'<br>'angl' |
| Random Dot ('RDOT') | Horizontal size<br>Vertical size<br>Percentage | 'DHSZ'<br>'DVSZ'<br>'pcnt' |
| Alpha Compositor ('Blnd') | Blend mode | 'bMod' |
| Zoom ('zoom') | Percentage<br>Centre X<br>Centre Y<br>Zoom variation<br>Zoom distance | 'pcnt'<br>'xcnt'<br>'ycnt'<br>'zvar'<br>'zdst' |

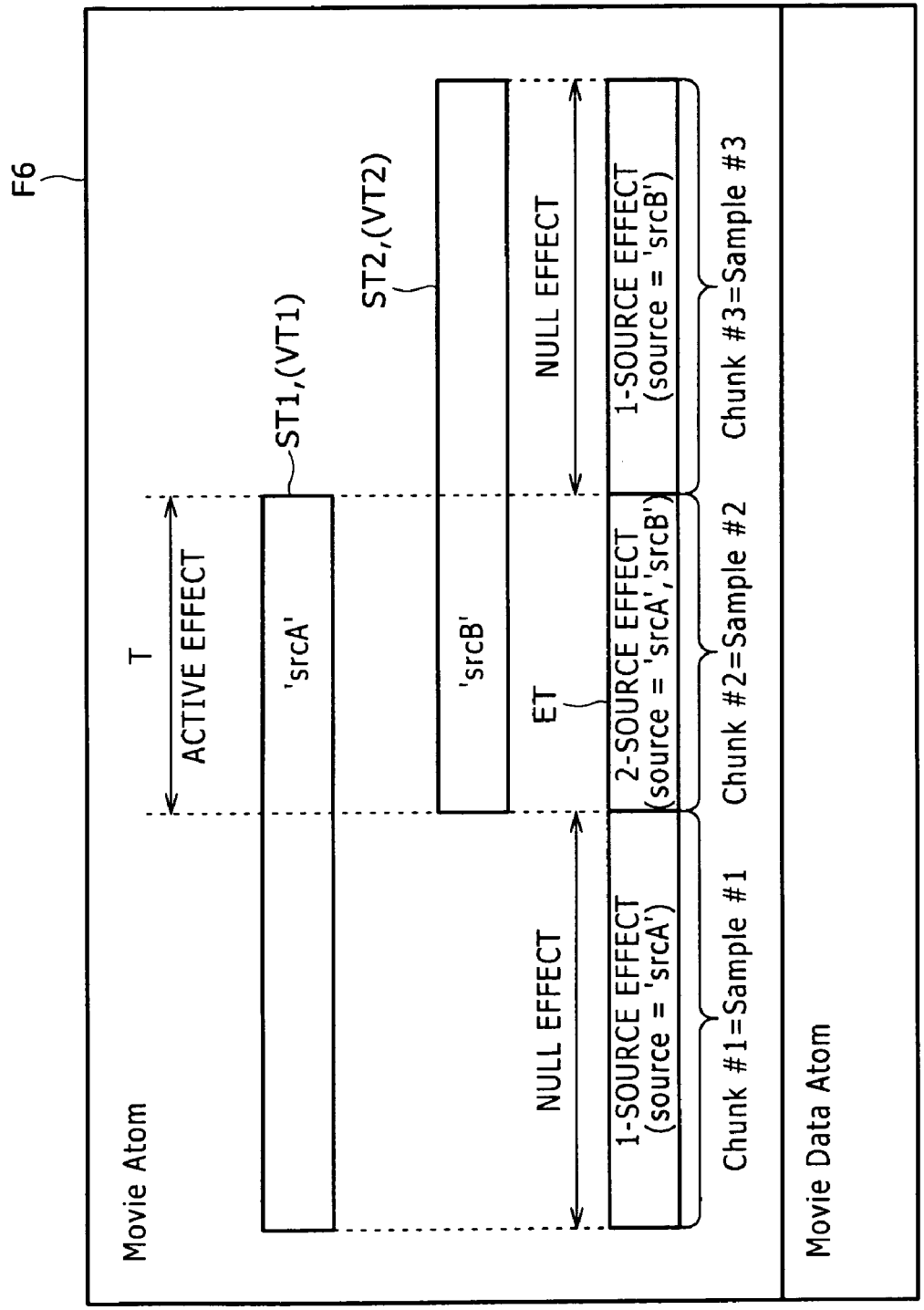

FILE RECORDING DEVICE, FILE REPRODUCTION DEVICE, FILE RECORDING METHOD, PROGRAM OF FILE RECORDING METHOD, RECORDING MEDIUM CONTAINING THEREIN PROGRAM OF FILE RECORDING METHOD, FILE REPRODUCING METHOD, PROGRAM OF FILE REPRODUCING METHOD, AND RECORDING MEDIUM CONTAINING THEREIN PROGRAM OF FILE REPRODUCING METHOD

BACKGROUND OF THE INVENTION

1. Technical Field

The present invention relates to a file recording apparatus, a file reproducing apparatus, a file recording method, a file recording method program, a recording medium that records the file recording method program, a file reproducing method, a file reproducing method program, and a recording medium that records the file reproducing method program. More particularly, the invention relates illustratively to the editing of pictures taken by use of a QT format file. The present invention proposes creating an effect track in accordance with the video track based on video data management information, the effect track being set to be either null effect having no effect advantage or active effect having an effect advantage. The invention further makes the file by setting a source track (target for the effect track) to the video track. These features are designed to reduce the burdens on the resources for editing files typically in the QT format and for reproducing such edited files.

2. Background Art

The quick time file format, called the QT format hereunder, is well known as a multimedia-compatible file format. With the QT format in use, real data such as moving pictures, still pictures and sound are grouped into blocks. Apart from such real data blocks, management information for managing the real data is collected and turned into blocks. These blocks will be called atoms in the description that follows. The atoms that bring together real data will be called movie data atoms and those which consolidate management information will be referred to as movie atoms.

The movie atoms have their management information arranged into boxes by attribute in a hierarchical structure, whereby diverse kinds of atoms are made. With the movies atoms, their hierarchically structured atoms are formed into various tracks using management information blocks according to the real data types in use. More specifically, if the movies atoms have media data composed of video data and sound data, these two kinds of data are formed into a video track and an audio track respectively. The two tracks are used to manage the corresponding real data in the movie data atoms. If the video data and audio data are multiplexed, as in the case of the video track being assigned not only video data of moving pictures but also still picture data (e.g., MPEG2-PS (program stream) data), the track furnished with management information is regarded not as a video track but as a base media track. Even with such a different track type, the track in question is subject to editing of real data if it is assigned video data. With this aspect taken into consideration, the video track in the ensuing description is assumed to cover as needed the base media track which includes video data and which is used to manage real data. Where reference is made specifically to a video track, that track is assumed to be one which differs from the sound track and which is assigned video data management information.

Under such real data management, not only movie data atoms held in a single file but also those held in other files are managed. Diverse media are thus provided in the so-called internal as well as external reference form.

Movie data atoms have their real data divided into samples constituting minimum manageable units. Where the QT format is in effect, management information is set to each of those minimum manageable units of the movie atoms which represent the real data. Meanwhile, when files are to be made in the QT format, each sample is generally constituted by one frame or one GOP (group of pictures) corresponding to a minimum increment of display, as disclosed illustratively in Japanese Patent Laid-Open No. 2001-94933, for the purpose of improving convenience in processing.

In an editing process where effects are applied to video data in the QT format, movie data atoms are assigned video data made from the real data that has been actually processed for effects. At the same time, a video track corresponding to the video data is used to create movie atoms which in turn are formed into a file.

The QT format is also provided for use in an editing process where effects are applied to video data using moving data atoms derived from the original video data in place of the movie data atoms resulting from the edited video data having actually undergone effect processing. In such video data editing, the effect track furnished with editing-related management information is formed into movie atoms, whereby the input source of the effect track is assigned the movie data atoms derived from the original video data.

As shown in FIGS. 1A through 1C, suppose that filtering effects such as blur are applied to a track segment T of a single video data stream in a so-called one-source effect process. In this example, a source track ST (FIG. 1B) identifying the real data in the track segment T is made on the basis of management information (in a sample table, to be discussed later) set for a video track VT (i.e., original track; FIG. 1A) corresponding to the real data based on the original video data. Also made is an effect track ET (FIG. 1C) that defines a specific process of effects on the source track ST.

In the above example, the real data corresponding to the video track VT constituting the original track is reproduced successively from a QT file. In parallel with data reproduction from the original track, real data is reproduced consecutively from the source track ST over the track segment T and is processed according to the effect track ET. The video data processed in keeping with the effect track ET is output in a manner taking precedence over the video data from the video track. In the one-source effect process, as outlined above, three tracks are handled during filtering-based editing work. In FIGS. 1A through 1C, the notation "scrA" is a proper name that identifies the source.

FIGS. 2A through 2E depict a typical two-source effect process in which transition-based effects such as cross fade are applied illustratively to two video data streams being edited. Video tracks VT1 and VT2 are established as the original tracks (FIGS. 2A and 2B) corresponding the real data constituting the two video data streams. Source tracks ST1 and ST2 subject to an effect process over a track segment T are made (FIGS. 2C and 2D) in accordance with management information about the two video tracks VT1 and VT2. There is also made an effect track ET (FIG. 2E) for defining specific effects to be performed on the source tracks ST1 and ST2.

In the example above, the real data corresponding to the video tracks VT1 and VT2 constituting the original tracks is reproduced successively from a QT file. In parallel with data reproduction from the original tracks, real data is reproduced consecutively from the source tracks ST1 and ST2 over the track segment T and is processed according to the effect track ET. The video data processed in keeping with the effect track ET is output in a manner taking precedence over the video data from the video tracks VT1 and VT2. In the two-source effect process, as described above, five tracks are handled during filtering-based editing work.

With the QT format in use, management information and real data are separately processed with regard to the effect track ET during editing work. In a file that is output following the editing, the types of editing-related effects such as chroma key are described chronologically. In corresponding movie data atoms, the parameters associated with each of the effects involved are described. As a result, in the QT file, the effect track is managed in units of samples every time a different effect type is used or a different parameter value is applied.

If it is possible to reduce the burdens on the hardware and software resources engaged in editing such files and in reproducing the edited files, the arrangements for processing such types of files will be implemented in a more simplified structure than before.

DISCLOSURE OF INVENTION

The present invention has been made in view of the above circumstances and provides a file recording apparatus, a file reproducing apparatus, a file recording method, a file recording method program, a recording medium that records the file recording method program, a file reproducing method, a file reproducing method program, and a recording medium that records the file reproducing method program for alleviating the burdens on the resources for editing files typically in the QT format and for reproducing such edited files.

In carrying out the invention and according to one embodiment thereof, there is provided a file recording apparatus for receiving input from a user in order to edit video data and to record a file based on a result of the edit, the file recording apparatus making an effect track by setting a null effect having no effect advantage and an active effect having an effect advantage with regard to a video track, the apparatus further making the file by setting a source track as a target for the effect track to the video track.

The inventive file recording apparatus structured as outlined above makes, given the user's input, the effect track by setting the null effect having no effect advantage and the active effect having an effect advantage with regard to the video track, and makes the file by setting the source track as the target for the effect track to the video track. Upon data reproduction, this embodiment can output edited video data by handling solely the effect track and source track and reduce correspondingly the burdens on the resources for editing files typically in the QT format and for reproducing the edited files.

According to another embodiment of the present invention, there is provided a file reproducing apparatus for reproducing a file of video data recorded on a recording medium and outputting the reproduced video data; wherein an effect track is made by setting a null effect having no effect advantage and an active effect having an effect advantage with regard to a video track, and by setting a source track as a target for the effect track to the video track; and wherein the file reproducing apparatus reproduces video data from the source track based on management information set to the effect track while subjecting the reproduced video data to an effect process, and outputs the processed video data.

Where the file reproducing apparatus structured as outlined above is in use, the effect track is made by setting the null effect having no effect advantage and the active effect having an effect advantage with regard to the video track, and by setting the source track as the target for the effect track to the video track. The inventive file reproducing apparatus reproduces video data from the source track based on the management information set to the effect track while subjecting the reproduced video data to the effect process, and outputs the processed video data. This embodiment, as with the preceding embodiment, can output edited video data by handling solely the effect track and source track and reduce correspondingly the burdens on the resources for editing files typically in the QT format and for reproducing the edited files.

According to a further embodiment of the present invention, there is provided a file recording method for receiving input from a user in order to edit video data and to record a file based on a result of the edit, the file recording method including the steps of making an effect track by setting a null effect having no effect advantage and an active effect having an effect advantage with regard to a video track, and making the file by setting a source track serving as a target for the effect track to the video track.

According to an even further embodiment of the present invention, there is provided a file recording method program for causing a computer to execute a procedure for receiving input from a user in order to edit video data and to record a file based on a result of the edit, the procedure including the steps of making an effect track by setting a null effect having no effect advantage and an active effect having an effect advantage with regard to a video track, and making the file by setting a source track serving as a target for the effect track to the video track.

According to a still further embodiment of the present invention, there is provided a recording medium which records a file recording method program for causing a computer to execute a procedure for receiving input from a user in order to edit video data and to record a file based on a result of the edit, the procedure including the steps of making an effect track by setting a null effect having no effect advantage and an active effect having an effect advantage with regard to a video track, and making the file by setting a source track serving as a target for the effect track to the video track.

The preceding three embodiments provide, as outlined above, a file recording method, a file recording method program, and a recording medium that records the file recording method program whereby the burdens on the resources for editing files typically in the QT format are reduced.

According to a yet further embodiment of the present invention, there is provided a file reproducing method for reproducing a file of video data recorded on a recording medium and outputting the reproduced video data; wherein an effect track is made by setting a null effect having no effect advantage and an active effect having an effect advantage with regard to a video track, and by setting a source track as a target for the effect track to the video track; the file reproducing method including the steps of reproducing video data from the source track based on management information set to the effect track while subjecting the reproduced video data to an effect process, and outputting the processed video data.

According to another embodiment of the present invention, there is provided a file reproducing method program for causing a computer to execute a procedure for reproducing a file of video data recorded on a recording medium and outputting the reproduced video data; wherein an effect track is made by setting a null effect having no effect advantage and an active effect having an effect advantage with regard to a video track, and by setting a source track as a target for the effect track to the video track; the procedure including the steps of reproducing video data from the source track based on management information set to the effect track while subjecting the reproduced video data to an effect process, and outputting the processed video data.

According to a further embodiment of the present invention, there is provided a recording medium which records a file reproducing method program for causing a computer to execute a procedure for reproducing a file of video data recorded on a recording medium and outputting the reproduced video data; wherein an effect track is made by setting a null effect having no effect advantage and an active effect having an effect advantage with regard to a video track, and by setting a source track as a target for the effect track to the video track; the procedure including the steps of reproducing video data from the source track based on management information set to the effect track while subjecting the reproduced video data to an effect process, and outputting the processed video data.

The preceding three embodiments provide, as outlined above, a file reproducing method, a file reproducing method program, and a recording medium that records the file reproducing method program whereby the burdens on the resources for applying effects to files typically in the QT format are reduced.

According to the present invention, as outlined above, the burdens on the resources for editing files typically in the QT format and for reproducing the edited files are reduced appreciably.

BRIEF DESCRIPTION OF DRAWINGS

FIG. 6 is a schematic view showing a typical atom structure of a video track for a one-source effect process on the QT file;

FIG. 7 is a schematic view continued from FIG. 6;

FIG. 8 is a schematic view showing a typical atom structure for a two-source effect process on the QT file;

FIG. 9 is a schematic view continued from FIG. 8;

FIG. 10 is a schematic view continued from FIG. 9;

FIGS. 11A, 11B and 11C are schematic views explaining a one-source effect process performed by the video disk apparatus of FIG. 3;

FIGS. 12A, 12B, 12C and 12D are schematic views explaining a two-source effect process performed by the video disk apparatus of FIG. 3;

FIG. 13 is a schematic view showing a sample description atom of a video track;

FIG. 14 is a schematic view showing a sample description atom of an effect track;

FIG. 15 is a tabular view listing effect types;

FIG. 16 is a schematic view showing an extension field containing a sample description atom for an effect track;

FIG. 17 is a schematic view showing an effect type field included in FIG. 16;

FIG. 18 is a tabular view giving a description of a parameter flag included in FIG. 16;

FIG. 19 is a tabular view listing parameters corresponding to the effect types shown in FIG. 15;

FIG. 20 is a tabular view continued from FIG. 19;

FIG. 22 is a schematic view explaining a QT file subject to a two-source effect process.

BEST MODE FOR CARRYING OUT THE INVENTION

Preferred embodiments of the present invention will now be described with reference to the accompanying drawings.

Figure 1:
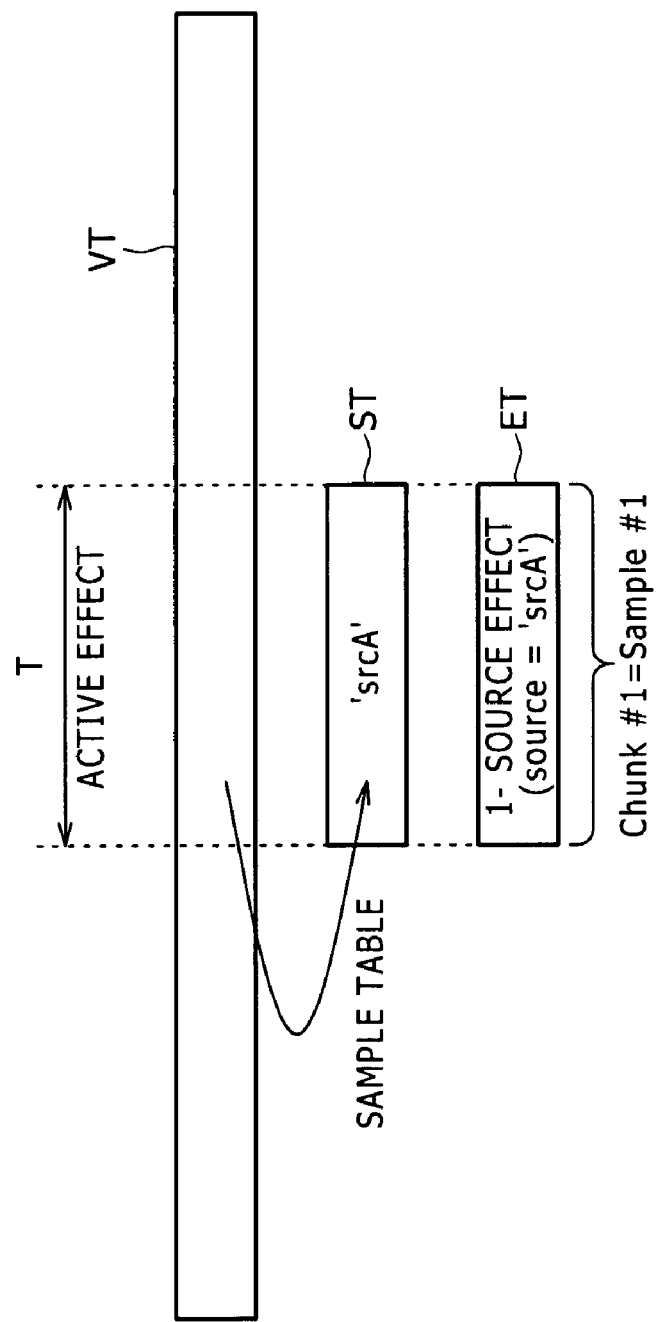
FIGS. 1A, 1B and 1C are schematic views showing how a QT file subject to a conventional one-source effect process is handled.
Figure 2:
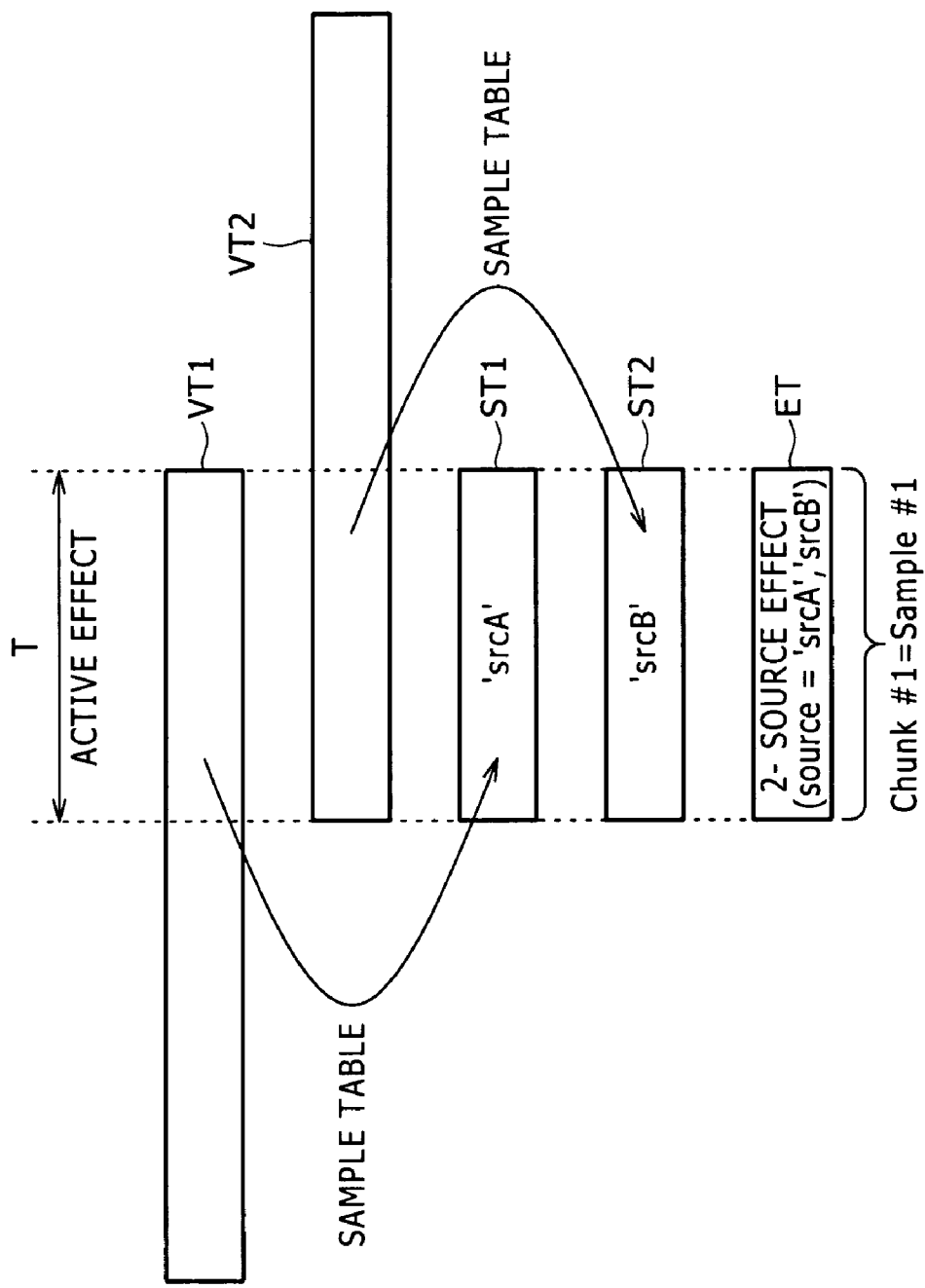
FIGS. 2A, 2B, 2C, 2D and 2E are schematic views showing how a QT file subject to a conventional two-source effect process is handled.
Figure 3:
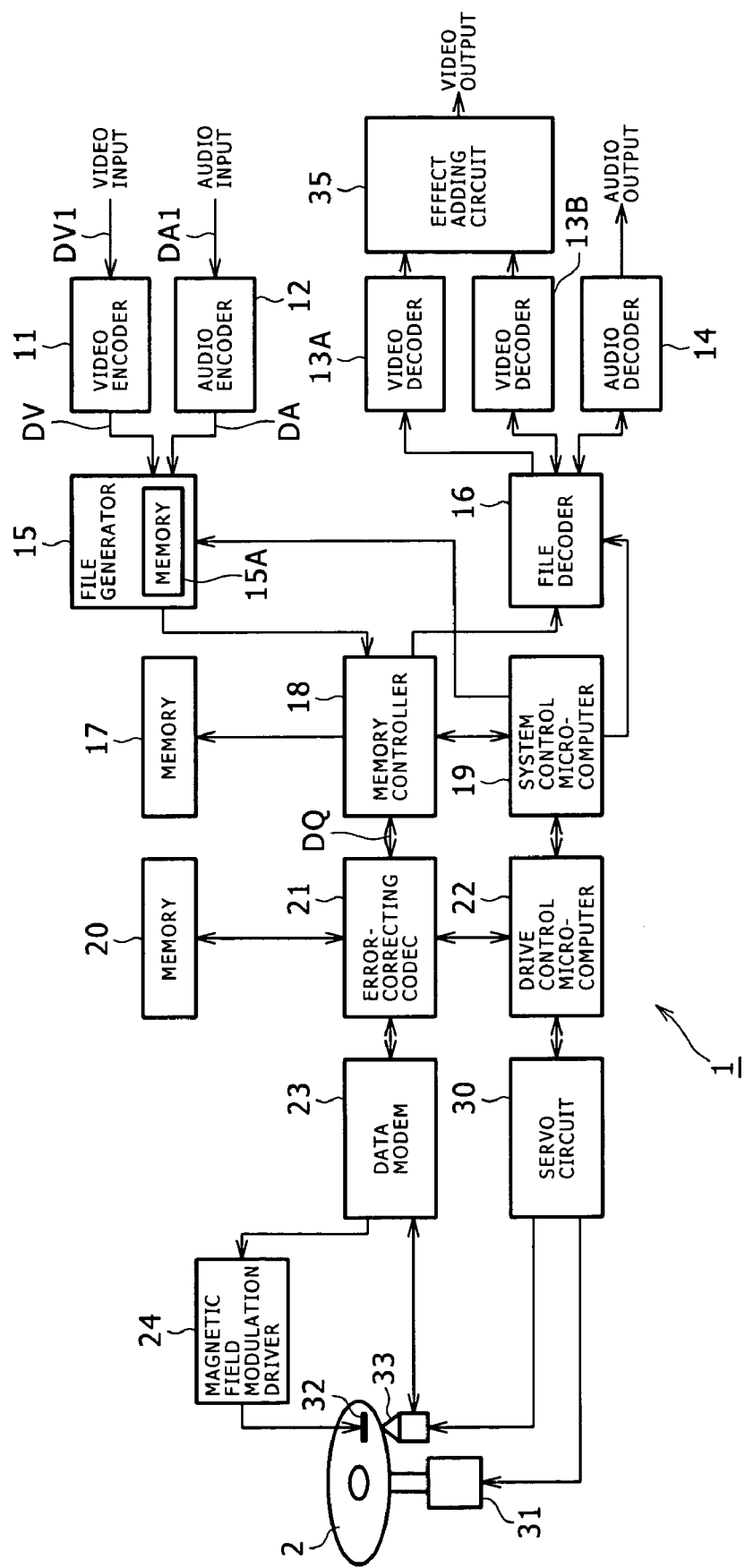
FIG. 3 is a block diagram of a video disk apparatus practiced as a first embodiment of the present invention.

(1) Structures of Embodiments (1-1) Overall Structure of the Video Disk Apparatus FIG. 3 is a block diagram of a video disk apparatus 1 practiced as one embodiment of the present invention. The video disk apparatus 1 acquires video and audio signals of an object using picture-taking means and audio acquiring means, not shown, and records to an optical disk 2 the acquired video and audio signals representative of the pictures taken of the object. The video disk apparatus 1 further reproduces signals recorded on the optical disk, and either outputs the reproduced signals through displaying means composed of a liquid crystal display panel and audio outputting means formed by speakers, or forwards the signals to an external device. Furthermore, after presenting a user with the reproduced video and audio signals, the video disk apparatus 1 receives settings of edit points from the user for editing work on the signals.

The video disk apparatus 1 compresses the acquired video and audio signals using the MPEG standard and records the compressed data in a suitable file format to the optical disk 2. This embodiment adopts the QT format as its file format. In the description that follows, any file in the QT format will be referred to as the QT file.

In the video disk apparatus 1, a video encoder 11 converts a video signal DV1 of the recorded pictures from analog to digital format in order to generate video data. The video encoder 11 then encodes the generated video data using the MPEG standard and outputs an elementary stream DV of the video data.

An audio encoder 12 converts an audio signal DA1 of the recorded pictures from analog to digital format to generate audio data. The audio encoder 12 then encodes the generated audio data using the MPEG standard and outputs an elementary stream DA of the audio data.

Upon recording, a file generator 15 multiplexes the elementary streams DV and DA coming from the video encoder 11 and audio encoder 12 in synchronized fashion to form a QT file under control of a system control microcomputer 19. During the process, the file generator 15 multiplexes the successively input elementary streams DA and DV so as to output movie data atom data consecutively. In correspondence with the movie data atom data, the file generator 15 adds to an internal memory 15A the data necessary for generating movie atoms and holds the added data in the memory. When recording of the movie data atoms is completed, the file generator 15 generates a data stream of movie atoms from the data held in the memory 15A.

A memory controller 18 switches its operation under control of the system control microcomputer 19. At the time of recording, the memory controller 18 successively records a QT file data stream from the file generator 15 to a memory 17 for temporary storage, and outputs the stored data in keeping with what takes place in an error-correcting codec 21 located downstream. Upon reproduction, the above process is reversed so that the memory controller 18 temporarily holds data coming from the error-correcting codec 21 in the memory 17 and outputs the retained data to a file decoder 16 and to the system control microcomputer 19.

The error-correcting codec 21 switches its operation under control of the system control microcomputer 19. At the time of recording, the codec 21 records temporarily the data from the memory controller 18 to a memory 20 and supplements the recorded data with error-correcting code. The error-correcting codec 21 further retrieves the data held in the memory 20 in a predetermined sequence and interleaves the retrieved data for output to a data modem 23. Upon reproduction, the above process is reversed so that the error-correcting codec 21 records temporarily the data from the data modem 23 to the memory 20 and interleaves the recorded data for output to the memory controller 18. During the process, any error in the data is corrected by use of the error-correcting code added thereto at the time of recording.

The data modem 23 switches its operation under control of the system control microcomputer 19. At the time of recording, the data modem 23 turns the data from the error-correcting codec 21 into a serial data stream, subjects the data stream to a modulating process and outputs the modulated stream to a magnetic field modulation driver 24 or an optical pickup 33. Upon reproduction, the data modem 23 reproduces a clock signal out of reproduced signals from the optical pickup 33 and subjects the reproduced signals to binary discrimination and demodulation so as to acquire reproduced data corresponding to the serial data stream generated upon recording. The reproduced data is output to the error-correcting codec 21.

Where the optical disk 2 is a magneto-optical disk, the magnetic field modulation driver 24 drives a magnetic head 32 using output signals from the data modem 23 under control of the system control microcomputer 19. The magnetic head 32 is positioned in symmetrically opposed relation to the optical pickup 33 across the optical disk 2. In that position, the magnetic head 32 applies to a laser beam-irradiated spot a magnetic field modulated to reflect the output data from the data modem 23. In this manner, where the optical disk 2 is a magneto-optical disk, the video disk apparatus 1 utilizes a thermomagnetic recording technique in recording a QT format file of taken pictures to the optical disk 2.

The optical disk 2, a disk-like recording medium for this embodiment, is a rewritable optical disk such as a magneto-optical disk (MO) or a phase change disk. A spindle motor 31 under control of a servo circuit 30 drives the optical disk 2 rotatively at a constant linear velocity (CLV), a constant angular velocity (CAV), or a zone constant linear velocity (ZCLV) depending on the disk type.

The servo circuit 30 controls the operation of the spindle motor 31 in a spindle control process based on various signals coming from the optical pickup 33. Likewise, the servo circuit 30 subjects the optical pickup 33 to tracking and focus control, and causes the optical pickup 33 and magnetic head 32 to do seeks and perform focus searches.

A drive control microcomputer 22 under instructions from the system control microcomputer 19 controls seeks and other operations of the servo circuit 30.

The optical pickup 33 emits a laser beam to the optical disk 2, receives reflected light from the disk using a suitable light-receiving device, and performs calculations of what has been received so as to generate and output diverse control signals. The optical pickup 33 further outputs reproduced signals of which the signal levels vary depending on rows of pits and marks detected on the optical disk 2. Furthermore, the optical pickup 33 switches its operation under control of the system control microcomputer 19. For recording to the optical disk 2 made of a magneto-optical disk, the optical pickup 33 raises intermittently the intensity of the laser beam emitted to the optical disk 2. In this process involving the so-called pulse train technique, the video disk apparatus 1 records taken pictures to the optical disk 2. For recording to the optical disk 2 formed by a phase change disk, the optical pickup 33 raises the intensity of the laser beam emitted to the optical disk 2 from read level to write level in accordance with output data from the data modem 23. In the process involving the so-called thermomagnetic recording technique, the video disk apparatus 1 also records taken pictures to the optical disk 2.

In the video disk apparatus 1, as described above, the video and audio signals representative of acquired pictures are first compressed by the video encoder 11 and audio encoder 12 into elementary streams. These streams are converted by the file generator 15 into a QT format file. That file is forwarded to the optical pickup 33 or to both the optical pickup 33 and the magnetic head 32 by way of the memory controller 18, error-correcting codec 21 and data modem 23, in that order. The QT format file is recorded to the optical disk 2 either by the optical pickup 33 or by both the optical pickup 33 and the magnetic head 32.

Furthermore, in the video disk apparatus 1, reproduced signals from the optical pickup 33 are processed by the data modem 23 into reproduced data which in turn is processed by the error-correcting codec 21, whereby the QT format file held on the optical disk 2 is reproduced. The data from the reproduced QT format file is output from the memory controller 18.

The file decoder 16 inputs the QT file data coming from the memory controller 18 and decomposes the input data into video and audio data elementary streams for output. In the process, the file decoder 16 acquires beforehand and retains movie atom data through seeks and other operations under control of the system control microcomputer 19. Based on management information set for the movie atoms, the file decoder 16 outputs the video and audio data elementary streams.

Video decoders 13A and 13B decompress video data elementary streams for output to the displaying means and external device, not shown. In the video disk apparatus 1, the video decoders 13A and 13B can each process a video data elementary stream. It follows that two-stream video data subject to a two-source effect process can be output in simultaneous and parallel fashion. An effect adding circuit 35 in the ordinary reproducing process lets the video data from the video decoder 13A or 13B be output unmodified under control of the system control microcomputer 19. When video data is output after being edited, the effect adding circuit 35 either adds or does not add effects to the video data from the video decoder 13A or 13B under instructions from the system control microcomputer 19. In a two-source effect process, the two video data streams from the video decoders 13A and 13B are converted by the effect adding circuit 35 into a single video data stream for output.

An audio decoder 14 decompresses the audio data elementary stream from the file decoder 16 and outputs the decompressed data stream to the audio outputting means and external device, not shown. In this process, the video disk apparatus 1 allows the user to monitor the pictures reproduced from the optical disk 2.

The system control microcomputer 19 provides overall control on the entire video disk apparatus 1. By carrying out appropriate processing programs held in a memory, not shown, the system control microcomputer 19 controls relevant components of the system in keeping with the user's operations. In so doing, the system control microcomputer 19 records acquired pictures to the optical disk 2, reproduces recorded pictures from the disk 2 for viewing by the user, and allows editing work to proceed.

For the video disk apparatus 1, it is assumed that the processing programs for use by the system control microcomputer 19 are preinstalled. Alternatively, the programs may be stored on a recording medium that is offered to the user for subsequent installation into the apparatus. The recording medium may be any one of diverse types of media including optical disks, magnetic disks, memory cards, and magnetic tapes.

(1-2) QT File

Figure 4:
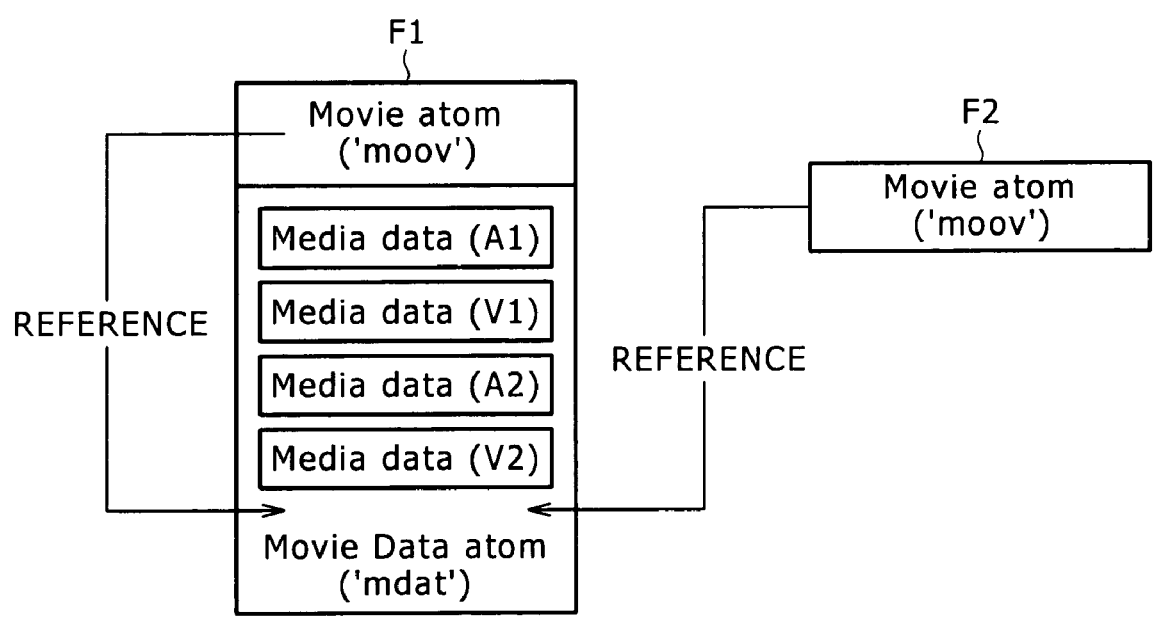
FIG. 4 is a schematic view explaining a typical QT file.

FIG. 4 is a conceptual view showing a basic structure of the QT file. The QT format was devised as a file format for implementing extended OS (Operating System) functions without recourse to specialized hardware. The QT format is a time-based multimedia file format that allows real data of diverse types including moving pictures, sound, still pictures, text, and MIDI to be reproduced synchronously on a single time base. The QT format is compatible with streaming data over networks.

Where the QT file format is in use, the diverse types of real data are accommodated individually on separate tracks as media data. Specifically, real data that constitute moving pictures, sound, and text are held on a video track, a sound track (i.e., audio track) and a text track, respectively. The QT file format also provides for an MPEG2-PS (program stream) track used to manage the type of data formed by multiplexing video and audio data, such as MPEG2-PS data.

QT files F1 and F2 have a movie data atom formed by a set of these tracks. Management information and other data about the tracks containing such movie data atoms are organized into movie atoms. The atoms are also called boxes. The movie data atom, with its atom type name set for "mdat," is also called media data. The movie atom, with its atom type name set for "moov," is also called a movie resource.

The QT file comes in two types: a self-contained type file F1 and an external reference type file F2. The self-contained type file F1 integrates movie data atoms and movies atoms, and the external reference type file F2 is made up of movie atoms only. In the case of the external reference type file F2, movie data atoms in other files F1 may be established as the object to be managed illustratively for nonlinear editing. Where the movie data atom found in another file F1 is used as an object for management by the file F2, the corresponding movie atom is assigned a relative path, an absolute path and other management information regarding the recording medium that accommodates the file F1 in question.

In the example of FIG. 4, a movie data atom in the self-contained type file F1 is assigned audio (A1 and A2) media data and video (V1 and V2) media data. These media data in the file F1 can be reproduced by use of either the movie atom in the file F1 or the movie atom in the external reference type file F2.

Figure 5:
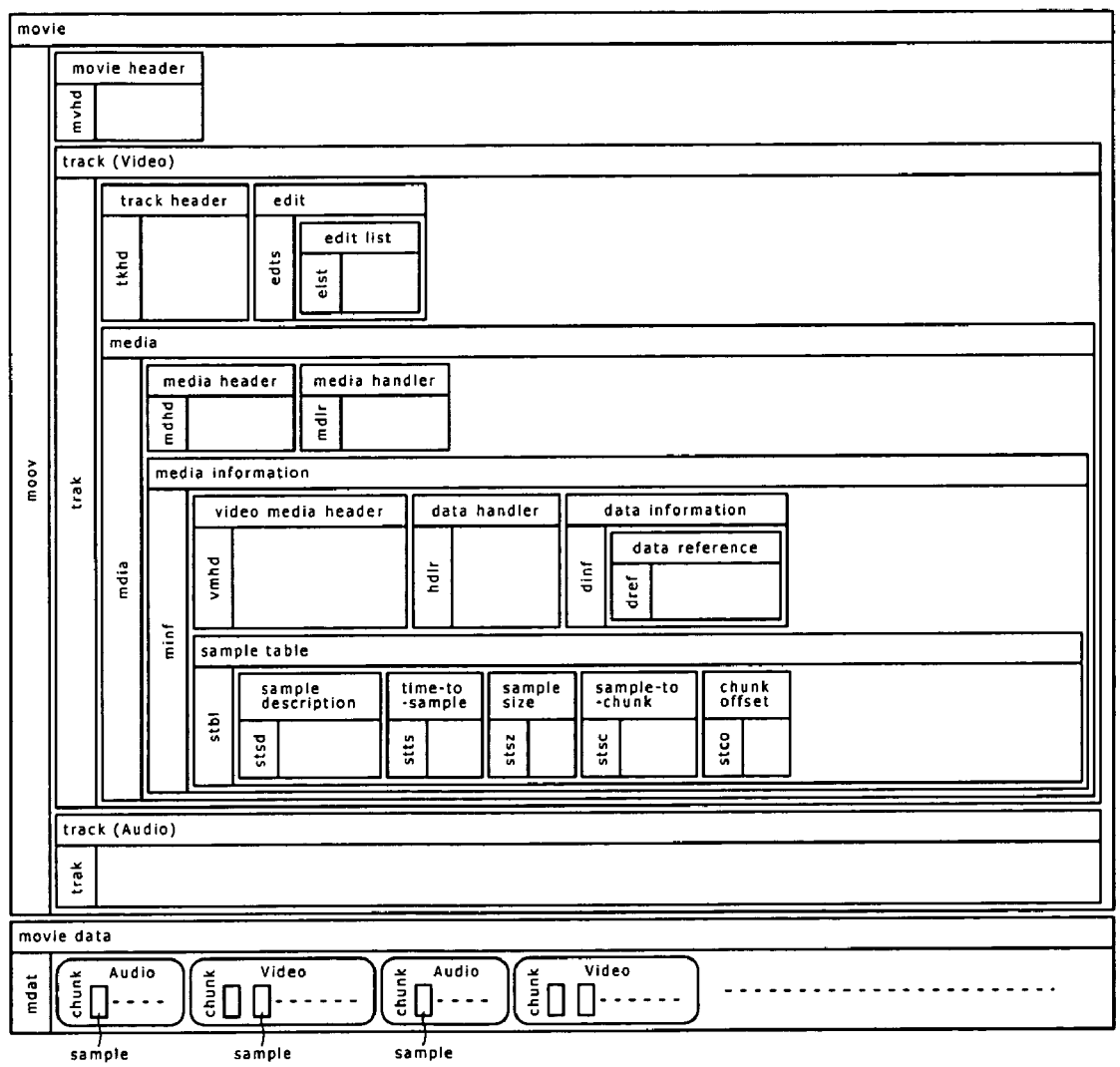
FIG. 5 is a schematic view showing a typical atom structure of the QT file.

FIG. 5 is a schematic view showing how a movie data atom is structured by a video track and an audio track regarding the self-contained type file F1, making up a general structure in which with the movie data atom and the corresponding movie atom are indicated together with the type name of each atom. For the movie atom in FIG. 5, the track atom (type name "track") concerning the audio track is shown without its subordinate atom structure. That is because the subordinate atom structure of the video track is substantially the same as that of the audio track.

The movie atom is made in a hierarchical structure in which management information is turned into atoms by attribute. Illustratively, a movie atom is formed by a movie header atom (movie header) and a track atom (track). The movie header atom accommodates header information and has its type name set for "mvhd." The track atom, on the other hand, is provided for each of the tracks set for the movie data atom. In this example, a video track and an audio track are provided. The track atom (track) is constituted illustratively by a track header atom (track header), an edit atom (edit), and a media atom (media). Each of these items describes information about each piece of the real data constituting the movie data atom.

The track header atom (track header) accommodates header information. The edit atom (edit) includes an edit list atom (edit list) as needed. The edit list atom (edit list) is furnished with such information as the time to an in-point or out-point and reproduction speed for use in nonlinear editing.

Each media atom (media), with its type name set for "mdia," is assigned information about managing the compression method, storage location, display time, etc., of the corresponding real data. The media atom is constituted by a media header atom (media header), a media handler reference atom (media handler reference), and a media information atom (media information). The media header atom (media header) is assigned header information. The media handler reference atom (indicated as "media handler" in FIG. 5) has the type of the corresponding real data recorded therein, ensuring distinction between video and audio data.

The media information atom (media information), with its type name set for "minf," is assigned diverse kinds of information regarding samples that constitute the units of management. The media information atom (media information) is constituted by a media information header atom (video media information header, sound media information header (indicated as "video media header" in FIG. 5)), a data handler reference atom (indicated as "data handler" in FIG. 5), a data information atom (data information), and a sample table atom (sample table).

The media information header atom has its type name set for "vmhd" on the video track and for "smhd" on the audio track with regard to an upper media handler reference atom (media handler reference). The media information header atom accommodates header information. On an MPEG2-PS track for managing MPEG2-PS (program stream) data in which video and audio data are multiplexed, the media information header atom (base (general) media information header) has its type name set for "gmhd." The data handler reference atom (data handler reference) is furnished with information about handling of the corresponding real data. The data information atom (data information) is assigned information about managing the storage location, storage method, etc., of the data to be actually referenced by the subordinate data reference atom (data reference).

The sample table atom (sample table), with its type name set for "stbl," is assigned information about each of the samples. The sample table atom (sample table) is constituted illustratively by a sample description atom (sample description), a time sample atom (time-to-sample), a sample size atom (sample size), a sample chunk atom (sample-to-chunk), and a chunk offset atom (chunk offset).

The sample description atom (sample description) holds information about decoding. Specifically, the sample description atom is assigned information about the data compression method in use and related information. The time sample atom (time-to-sample) describes relations between each sample and the decoding-related time base by use of frame rates. The sample size atom (sample size) describes the data size of each sample. The sample chunk atom (sample-to-chunk) describes relations between each chunk and the sample that makes up that chunk. A chunk refers to one of the blocks derived from each of track data items allocated to the movie data atom. A single chunk is formed by a set of samples. The chunk offset atom (chunk offset) retains information about the starting location of each chunk relative to the beginning of the file. In the QT format, what is recorded as the management information in the sample table atom is used to reproduce successively the samples that constitute individually the units for management of real data.

In the movie data atom, the elementary streams of video data and audio data (i.e., real data in the QT file) are each allocated as a set of samples to the chunks. A chunk furnished with the video data elementary stream and a chunk with the audio data elementary stream occur alternately.

With this embodiment, the compression encoding method of MPEG1 Audio Layer 2 is applied by the audio encoder 12 to the audio data elementary stream, and MPEG2 Video by the video encoder 11 to the video data elementary stream so as to create encoded audio and video data. The QT file may alternatively employ video data encoded using the Motion JPEG, Motion JPEG2000, MPEG4, or AVC (Advanced Video Coding: MPEG4-part 10) standard, and audio data encoded using the Dolby AC3 or ATRAC (Adaptive Transform Acoustic Coding) standard. As another alternative, the QT file may utilize data in which video and audio data are multiplexed such as MPEG2-PS (program stream) data.

In addition to the video and audio tracks in the QT format, there may be provided another track called an effect track on which to describe the effects to be added to the video data. This structure in the QT format is shown in FIGS. 6 through 10. These are schematic views describing in the C language the file structure of the QT format, with different type names allocated to different type fields. FIGS. 6 and 7 illustrate an example of filtering-based editing known as the one-source effect process in which the object to be edited is one video track. Typical filtering effects applicable to the single video source include monochromatic conversion, conversion to sepia, blur, and mosaic.

FIGS. 8 through 10, meanwhile, depict an example of the so-called two-source effect process in which the objects to be edited are two video tracks. It should be noted that FIGS. 6 through 10 omit audio tracks, describing solely the relations between a track called the source track on which to manage the video data serving as an input source for applying effects using the effect track on the one hand, and the effect track on the other hand.

In the QT format, the effect track is formed in substantially the same manner as the video track. That is because the media type defined for the effect track is the same as that for the video track so that video media tracks are applicable. Since the source track may have video data as the object to which to add effects, it is obvious that the source track either has the video media type or the media type which handles MPEG2-PS data wherein video and audio data are multiplexed. With this embodiment, the source track is described as the video media type track.

In the QT file, as shown in FIG. 6, a move header atom (movie header) of the movie atom is followed by a track atom of the video track. The track atom is structured as explained above with reference to FIG. 5. In the QT file, the video track is designated as the source track. The source track is followed by a track atom (effect) of the effect track. As with the video track, a track header atom (track header), an edit atom (edit), and a media atom (media) are formed on the effect track. These atoms on the effect track are supplemented by a track reference atom (type name: tref)).

The track reference atom describes information for designating relations of reference to the source track that is the object to which to add effects. That is, the track reference atom describes a track ID written in the track header atom (type name: tkhd) of the source track corresponding to the track reference type atom (type name: ssrc) belonging to the atom in question. The track ID is a unique identification code set for each track. This identification code makes it possible to identify the video track to be processed using the effect track.

In the case of the one-source effect process, as shown in FIGS. 6 and 7, one of the video tracks set in the movie atom is identified by the track ID of the track reference type atom. In the case of the two-source effect process, as depicted in FIGS. 8 through 10, at least two video tracks are set in the movie atom. Two track IDs are set in the track reference type atom, allowing the two video tracks provided in the movie atom to be identified.

The effect track, with its media header atom (media header), media handler reference atom (media handler reference) and media information atom (media information) constituting the media atom of the video media type, is supplemented by a track input map atom (type name: imap). The track input map atom is the object to which to add effects. Information about the source track serving as the input for the effect track is described in the track input map atom using a QT atom structure.

The QT atom structure is packed by use of containers with a QT atom container QT (type name: sean) furnished as the highest atom. A necessary number of track input QT atoms are provided (type name is "in"; the first two characters of the type name are given in the hexadecimal notation "0x0000"). The track input QT atom is assigned an input type QT atom (type name is "ty"; the first two characters of the type name are given in the hexadecimal notation "0x0000") designating the input source as video media, as well as a data source type QT atom (type name: dtst) describing a unique name of the corresponding source track.

Whereas there is provided one track input QT atom for the one-source effect process illustrated in FIGS. 6 and 7, two track input QT atoms are provided for the two-source effect process shown in FIGS. 8 through 10.

With the QT file in effect, FIG. 11C shows relations between a movie atom (movie resource) and a movie data atom for a one-source effect process, and FIG. 12B depicts relations between these two atoms for a two-source effect process. These relations indicate that source tracks ST, ST1 and ST2 can be identified by use of the track reference atom (tref) and track input map atom (imap) of the effect track ET. FIGS. 11A, 11B, 12A, 12B and 12C illustrate relations between the video data constituting real data on the one hand, and the effects to be added to the video data on the other hand, with regard to the effect track.

On the effect track, effect-related information is allocated to the sample description atom (sample description) of the sample table atom (sample table). FIG. 13 is a schematic view showing a typical sample description atom (sample description) of the video track. In FIGS. 13 and 14, the data sizes of the fields involved are indicated in bytes in parentheses.

On the video track, the sample description atom (sample description) is assigned its size, type name (stsd), version and flags, in that order. The sample description atom is further assigned the number of entries, each of the assigned entries being an allocated video sample description entry of the data compression method in use and other related information.

Each entry (video sample description entry) is assigned its size, followed by a data format that describes the data compression method in effect. Each video sample description entry is further assigned a field called the frame count that describes the number of frames allocated per sample, and other fields as information regarding the data format.

On the effect track, the sample description atom (sample description) is assigned its size, type (stsd), version, flags, and the number of entries like the sample description atom on the video track, as shown in FIG. 14 in contrast to FIG. 13. The number of entries is followed by a necessary number of effect sample description entries regarding the effects to be added.

The entry (effect sample description entry) with respect to each effect is assigned the size of the entry in question, followed by a data format that describes the effect type. As shown in FIG. 15, the effect types are each described in four alphabetic characters. The types such as Blur (blur), Color Style (solr), Color Tint (tint), Edge Detection (edge), Emboss (embs), HSL Color Balance (hslb), RGB Color Balance (rgbb), Sharpen (shrp), Brightness and Contrast (brco) may be allocated for one-source effect use. Although not explained here, chroma key, cross fade, push, slide, alpha blend, and zoom; as well as wipe, iris, radial, matrix, etc., defined by SMPTE (Society of Motion Picture and Television Engineers) are allocated for two-source effect use. With this embodiment, the effect types are further supplemented by posterization (YPST), Mosaic (MOSA), RGB Reverse (Negative) (NEGA), Random Dot (RDOT), and User Defined Effect (UDEF).

Posterization is a process that reduces the number of levels of brightness; Mosaic (MOSA) is a process involving the application of mosaics to pictures; RGB Reverse (Negative) (NEGA) is a negative-positive reverse process; Random Dot (RDOT) is a two-source process that switches pictures by randomly allocating dots. These effects serve to make this embodiment easier and more convenient to use than ever.

User Defined Effect (UDEF) is a broad identifier of effects that may be defined in extended fashion by the manufacturer or vendor offering equipment and devices constituting this embodiment. Detailed effects under the category of User Defined Effect (type name: UDEF) become effective only when defined by the user employing an extension atom provided by the manufacturer for describing data format extension information, as will be discussed later.

The entry (effect sample description entry) regarding each effect is further assigned the same fields as those of the entry on the video track such as Reserved and Data Reference Index. Allocated at the end is the extension atom provided for describing data format extension information.

The extension atom prepared for describing data format extension information is assigned a stream descriptor atom that permits description as shown in FIG. 16. As illustrated, the stream descriptor atom is assigned its size, type (strd), version and flags, in that order, followed by specific data fields constituting the data format extension information. The data fields include Data Format, User Defined Effect Type, and Parameter Flag. The Version and Flags are allocated here to provide for future expansion. With this embodiment, the two fields are assigned a value of "0x0" each.

In the extension atom, the Data Format extension field describes the same effect type (type name) as that in the data format of the entry (effect sample description entry) for each effect discussed above with reference to FIGS. 14 and 15.

The User Defined Effect Type extension field describes a specific effect type defined by the user. This extension field is a four-byte field divided into two segments of two bytes each as shown in FIG. 17. The two segments accommodate an owner ID and an effect ID.

The owner ID is an ID that identifies a predetermined manufacturer name allocated to each manufacturer. The effect ID is an ID that identifies the name of a detailed effect defined uniquely by the manufacturer. This embodiment is arranged to accommodate diverse effects developed by the manufacturer handling the QT format flexibly. The broad identifier of User Defined Effect (UDEF) is used to indicate that the Data Format field of the entry (effect sample description entry) regarding each effect designates an expansion effect defined uniquely by the manufacturer. In the extension atom, the effect name field is divided into two segments of two bytes each. The two segments define the uniquely defined extension effect type by use of the owner ID and effect ID. This means that the extension effect type can be defined uniquely in a self-contained manner by the manufacturer, whereby any duplication of codes that may be assigned to the fields is prevented for operation management. In fact, if any specifically extended effect is defined without recourse to the owner ID and effect ID, the steps to be taken to avert the duplication of four alphabetic characters between manufacturers wishing to define new effects will become inordinately complex, and so will be the control over the order in which the manufacturers are to apply for their own definitions. In addition, further difficulties are expected if manufacturers attempt to define their own effects without introducing extension atoms and solely through the use of the Data Format field of the entry (effect sample description entry) regarding each effect. Since the value "0x0" is reserved, if the owner ID and effect ID of the data field are assigned that value, then the User Defined Effect (UDEF) identifier cannot be used when set for any of the effect types of the data format fields explained above with reference to FIG. 15. If a previously defined effect type other than any of those under the User Defined Effect (UDEF) identifier is set, the value in the owner ID or effect ID is meaningless. Thus previously defined effect types are usually assigned the reserved value "0x0" when they are set.

As shown in FIG. 18, the Parameter Flag data field is arranged in such a manner that the least significant bit in the two-byte field is used to specify whether or not to enable the effect sample entry in which is set the effect parameter of the real data corresponding to this effect track. If the effect is processed by use of the effect sample entry of the corresponding parameter and if no picture change occurs in the video data before and after the effect, then the effect sample entry of the parameter in question is set to be disabled. This flag setting of the embodiment eliminates wasteful steps and reduces processing load, as will be discussed later. The upper 15 bits in the Parameter Flag data field are reserved for future expansion.

The real data on the effect track allocated to the movie data atom is stored in units of effect samples as in the case of the video data on the source track. On the effect track, each effect type is defined in the data format field of the sample description atom. The real data for the effect track is arranged to accommodate the parameter data for a type-specific effect process performed by use of the sample description atom.

FIGS. 19 and 20 are tabular views listing typical parameters allocated to the movie data atom with regard to effect types. Each parameter name is indicated by four characters representing the parameter type. Each parameter value is stored along with a header identifier constituting the type name that designates the parameter type in the movie data atom.

In the case of, say, the Brightness and Contrast (brco) effect type, a brightness and a contrast parameter may be set for the type. If the two parameters are set for the default value of 0, then nothing changes in the output in terms of brightness and contrast as a result of the effect process. The absence of any effect is called null effect, and the manifestation of the effect is called an active effect. The Parameter Flag data field discussed above gives null effect when set to 0 and triggers an active effect when set to 1.

(1-3) Processing of the QT File

In the video disk apparatus 1, a video data elementary stream DV and an audio data elementary stream DA which are input from the picture-taking means or the like as real data are multiplexed by the file generator 15 before being recorded to the optical disk 2. In this manner, a movie data atom is recorded successively. In keeping with the recording of real data to the movie data atom, management information is acquired successively and retained in the memory 15A of the file generator 15. Upon completion of the real data recording, the management information held in the memory 15A is used to create a movie atom which is then recorded to the optical disk 2.

Figure 21A:
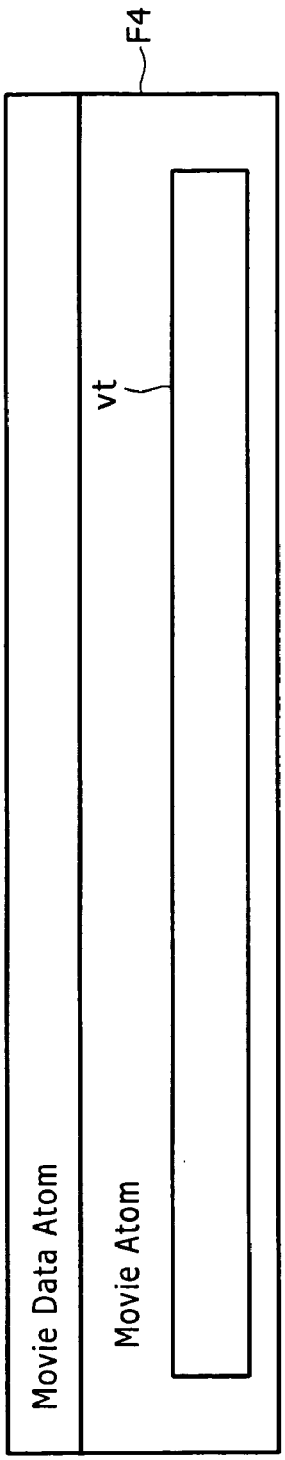
FIGS. 21A and 21B are schematic views explaining a QT file subject to a one-source effect process.
Figure 21B:
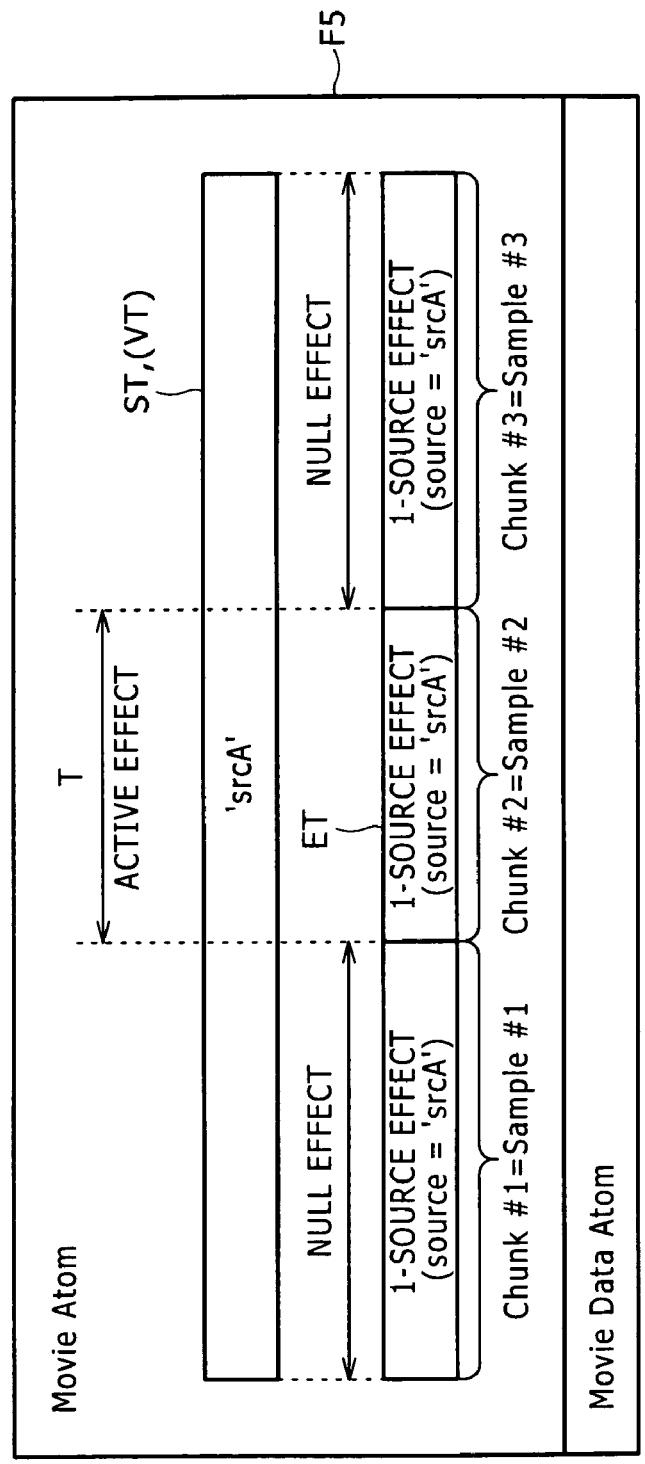

The system control microcomputer 19 controls overall performance of the recording of the movie data atom and movie atom by carrying out relevant steps to control the operation of the file generator 15 and by suitably processing the management information held in the memory 15A. As a result, the video disk apparatus 1 establishes the movie data atom made up of the real video and audio data representative of the pictures taken, as shown in FIGS. 21A and 21B. A QT file F4 is recorded with a video track "vt" and an audio track (not shown) set in the movie atom in accordance with the management information about the real data.

The user may then select edit mode with regard to the pictures recorded on the optical disk 2. In this case, the system control microcomputer 19 displays a predetermined menu on a display screen, not shown, which allows the user to make choices and input various editing instructions. In the process, the system control microcomputer 19 receives such settings as in-points and out-points as well we selected effects. When the user gives an instruction to record the file having been thus edited, the system control microcomputer 19 records the corresponding file to the optical disk 2.

During the process, the system control microcomputer 19 makes an effect track ET based on the video track "vt" of the movie atom in the file F4 selected by the user as the object to be edited. With the effect track ET thus generated, the system control microcomputer 19 makes accordingly a newly edited file F5 in the external reference format that allows the movie data in the original file F4 to be referenced from the effect track ET.

Specifically, the system control microcomputer 19 records the video track VT to the optical disk 2 by copying the track atom of the video track "vt" from the file F4 being edited. Depending on the user's input, the system control microcomputer 19 makes the effect track ET by setting null effects each representative of a disabled effect and active effects each denoting an enabled effect with regard to the video track VT. The source track ST serving as the target for the effect track ET is further set to the video track VT.

Illustratively, suppose that the user designates a filtering-related effect for a track segment T. In that case, the segment T is set as an active effect segment and the segments with no effect designated are established as null effect segments. As shown in FIGS. 11A and 11B, effect samples of the active and null effect segments have each an entry made in the sample description atom. The effect track is made by setting these entries in such a manner that relevant processes are carried out on the active and null effect segments.

A track input map atom and a track reference atom are then established so that the video track is designated as the source track.

Given the above settings, the system control microcomputer 19 in the one-source effect editing process makes a newly edited file F5 in such a manner that reproduction will be performed by handling two tracks, i.e., the source track and the effect track. This reduces the burdens on the resources during reproduction.

If the user designates a two-source effect process, the system control microcomputer 19 makes a newly edited file F6 by similarly setting the active effect segments, null effect segments, and the source track as indicated in FIG. 22.

In the case above, track atoms of the two video tracks VT1 and VT2 for the object being processed in the two-source effect process are made by duplication. In keeping with the in-points and out-points set by the user, the system control microcomputer 19 establishes track segments T on the video tracks VT1 and VT2 as active effect segments and the remaining segments with no effects designated as null effect segments.

As shown in FIG. 12, effect samples of these active and null effect segments have each an entry made in the sample description atom. The effect track ET is made by setting these entries in such a manner that relevant processes are carried out on the active and null effect segments. The null effect segments of the two-source effect process are subject to the same settings as those of the one-source effect process. In this example, the first null effect sample on the effect track designates the source track ST1 while the null effect sample following the active effect segment designates the source track ST2.

In addition, a track input map atom and a track reference atom are established so that the video tracks VT1 and VT2 are designated as the source tracks ST1 and ST2 respectively.

Given the above settings, the system control microcomputer 19 in the two-source effect editing process makes a newly edited file F6 in such a manner that reproduction will be performed by handling three tracks, i.e., the two source tracks ST1 and ST2 and the effect track. This reduces the burdens on the resources during the editing process.

In establishing null effect segments, it is possible to set parameters in such a manner that no effects will manifest themselves. This, however, requires that upon reproduction, the corresponding parameters set in the movie data atoms be accessed and acquired for use in processing video data.

The above requirement is circumvented when the system control microcomputer 19 suitably sets the parameter flag (FIG. 18). This makes it possible to distinguish null effect entries from active effect entries using solely the management information in the movie atom and without referencing the parameter values in the movie data atom.

The system control microcomputer 19 is thus set to detect null effect entries based on the parameter flag during reproduction. When null effects are normally processed without reproduction of the corresponding parameters, the burdens on the resources during reproduction can be reduced.

After being set to process null effects based on the parameter flag, the system control microcomputer 19 makes effect samples using default effect names (e.g., Brightness and Contrast (brco)) and parameters (e.g., Brightness=0, Contrast=0). The effect samples thus made allow the edited files F5 and F6 to be normally reproduced even by conventional QT file-related applications which are not structured to process null effects based on the parameter flag.

The system control microcomputer 19 establishes effect types for the active effect entries among other entries in accordance with the user-selected effect types. If any effect type is an original effect offered by the manufacturer of the video disk apparatus 1, then that effect type is established as a user defined effect type. The owner ID and effect ID regarding the effect type are then set in an extension field in order to identify the effect type in question. In this manner, this embodiment allows diverse effects to be implemented with ease and flexibility.

Meanwhile, if the user designates reproduction of a QT file edited by use of the effect track thus established, the system control microcomputer 19 reproduces successively the movie atom from the user-designated QT file by controlling the reproducing block in operation. The system control microcomputer 19 reproduces the movie data atom based on what is recorded in the movie atom.

In the process above, the system control microcomputer 19 reproduces the source track of the edited QT file on the basis of what is recorded in the track reference atom and track input map atom on the effect track. If there exist the original video track and the source track made by copying from the original video track those track segments desired to be processed for effects as shown in FIGS. 1A through 2E, the system control microcomputer 19 in the one-source or two-source effect process handles the video track, source track, and effect track in keeping with the description of the edit atom in each track atom. The video data derived from the source track is thus processed by use of the effect track. The system control microcomputer 19 further switches layers with regard to the video data on the video track to output the result of the process, thus reproducing the edited QT file that is conventionally structured. That is, the output from the original video track is displayed in the foreground except where active effect segments are in effect. Over the active effect segments, the output from the effect track that adds effects to the source track is displayed in the foreground.

Conversely, suppose that the original video track is established as the source track and that the effect track is formed by null and active effect segments as shown in FIGS. 21A, 21B and 22. In that case, video data is reproduced from the source track based on the null and active effect segments on the effect track. The reproduced video data is then processed for effects before being output. With conventionally structured QT files, it has been necessary to handle three tracks for the one-source effect process and five tracks for the two-source effect process. With QT files of this embodiment, by contrast, it is possible to handle just two track for the one-source effect process and three tracks for the two-source effect process. The inventive features reduce the burdens on the reproducing block and system control microcomputer 19 in dealing with edited files.

During the process involving null and active effects, the system control microcomputer 19 checks to determine whether an extension field (stream descriptor atom) is set in the sample description atom of the effect track. If the extension field is found set, the system control microcomputer 19 checks the setting of the parameter flag established in the extension field. On the basis of the checked parameter flag setting, the system control microcomputer 19 determines a null effect or an active effect. If an active effect is detected from the parameter flag, the system control microcomputer 19 reproduces the data of the effect-related parameters which are found in the movie data atom and which constitute the corresponding real data. Using the parameters, the system control microcomputer 19 carries out the effect process. If null effect is detected from the flag setting, the system control microcomputer 19 outputs the corresponding video data unmodified from the source track without reproducing any real data.

The video disk apparatus 1 then stops reproducing parameters from the movie data atom associated with the null effect. The system control microcomputer 19 further stops the processing based on the reproduced parameters. This helps reduce the burdens on the resources.

If an active effect is found set by the parameter flag and the corresponding parameter is reproduced accordingly from the movie data atom, and if that parameter is set for a value that suppresses the manifestation of effects, the result is equivalent to the null effect setting but video data will be processed from the source track. Thus where no parameter flag is set illustratively because of added extension fields, the effect track may be made in correspondence with the video track (as the source track) in a manner allowing relevant null and active effects to be established. This reduces the number of tracks to be handled so that the burdens on the resources may be reduced during processing.

With no extension field set in a conventionally formatted QT file but with the above settings in place, the system control microcomputer 19 reproduces parameter data in the same manner as when active effects are deemed set by the parameter flag. The reproduced parameter data is used to process the effects involved.

When processing and outputting video data for each of the effect types set on the effect track, the system control microcomputer 19 determines the owner ID and effect ID in the extension field if each effect type is found established as a user defined effect. If the effect type identified by the owner ID and effect ID thus determined is found untreatable by the video disk apparatus 1, the system control microcomputer 19 might output the video data without any modification as in the case of null effects. Where the effect type identified by the owner ID and effect ID is found treatable by the video disk apparatus 1, i.e., if program modules for dealing with the effect in question are implemented, then the system control microcomputer 19 processes and outputs the video data following the effect process specified by the owner ID and effect ID.

(2) Operation of the Embodiment

In the video disk apparatus 1 of the above-described structure, the video signal DV1 acquired by the picture-taking means is compressed by the video encoder 11 and input to the file generator 15 at a variable rate. The audio signal DA1 acquired through microphones or the like is compressed by the audio encoder 12 and input to the file generator 15. The two signals are converted by the file generator 15 into a QT file which is then recorded to the optical disk 2 in the subsequent series of steps.

The video and audio data are converted by the file generator 15 into samples and chunks and are interleaved in units of chunks for output as movie data atom data. The output data is recorded to the optical disk 2. Even as the video and audio data are being processed successively, the information necessary for reproducing the samples and chunks is acquired from the processed data and stored into the memory 15A as management information. When the recording of the movie data atom constituting real data is completed, the management information held in the memory 15A is output as movie atom data to the recording means. A movie atom corresponding to the movie data atom is then recorded to the optical disk 2. The video and audio data are recorded as the QT file to the optical disk 2. In the QT file thus recorded, the management information for managing the video and audio data (i.e., real data allocated to the movie data atom) is organized into a hierarchical structure. A video track derived from the video data management information and a sound track resulting from the audio data management information are established in the movie atom.

With the QT file recorded as described on the optical disk 2 and given the user's reproduction instruction, the system control microcomputer 19 causes the movie atom data to be reproduced from the optical disk 2. Under control of the system control microcomputer 19, the movie data atom data is reproduced from the optical disk 2 and decoded back to the original video and audio data in accordance with the management information established in the movie atom. The video and audio data thus decoded are output from the video decoders 13A, 13B and from the audio decoder 14. In carrying out the operation above, the video disk apparatus 1 allows the user to verify the pictures taken illustratively for an editing process.

When the user gives an instruction to edit video data in the QT file thus recorded, the movie atom is reproduced from the QT file being edited. Copying the video track atom of interest in the movie atom makes the video track that serves as the source track for the edited QT file. For the video track, the absolute path and other settings are established in such a manner that the corresponding video data in the original QT file will be furnished as real data. In this manner, a new QT file is made with the movie data atom of the original QT file turned into the external reference format.

When the user designates in-points, out-points, effect types and other settings, an effect track is made in the QT file with its video track formed by copying the user settings. The effect track is formed by setting null effects each representative of a disabled effect and active effects each denoting an enabled effect with regard to the video track. In addition, a copied video track is established as the source track.

To reproduce a conventionally edited QT format file would require that the original video track, source track, and effect track be handled. By contrast, the video disk apparatus 1 of this invention reproduces the QT file by handling the source track and effect track only, the source track being represented by the original video track. This can be a significant reduction in the processing load on the resources in reproducing edited files.

On the effect rack, the track reference atom and track input map atom are set to point to the source track. In the sample description atom, the effect track is made by successively establishing effect types representative of diverse effects including null effects. In correspondence with the settings in the sample description atom of the effect track, the effect parameters making up the real data on the effect track are allocated to the movie data atom of the edited QT file.

For a one-source effect application, the effects are set so as to point to a single source track ST. The effect track ET is made to specify that null effects and active effects be executed in a one-source effect process (FIGS. 11A, 11B and 11C). For a two-source effect application, the effects are set so as to point to two source tracks ST1 and ST2. The effect track ET is made to specify that null effects be executed in a one-source effect process and that active effects be carried out in a two-source effect process (FIGS. 12A through 12D).

In the one-source effect application at the time of reproduction (FIGS. 21A and 21B), the video data on the source track is reproduced consecutively in accordance with the effect track and the reproduced video data is output after being processed for null effects. Since the actual segment T of interest is set for an active effect, the video data is output after being processed by use of the source track in the process corresponding to the segment. With the two tracks handled as described, the edited file can be reproduced.

In the two-source effect application (FIG. 22), the video data on two source tracks is reproduced in keeping with the effect track in a suitable sequence of editing. If the video data on one of the two source tracks is to be output, a null-effect process is carried out on the data before the output. Over a transition segment T, the video data on the two source tracks is processed for active effects before being output. In this manner, the edited file is output by handling three tracks.

As described, the video disk apparatus 1 utilizes extension entries regarding necessary effects when making the effect track, and establishes an identification flag that distinguishes a null effect from an active effect in each of the extension fields. When the QT file thus edited is reproduced through the process reflecting such identification flag settings, the null effects are processed without acquisition of the real data parameters set in the movie data atom and without the need for performing effect process calculations. This makes it possible to bypass the processes of reproducing the movie data atom and of dealing with the reproduced parameters. The result is an appreciable reduction of the burdens on the resources in processing what has been edited.

If an extension field is found to have its identification flag set to designate an active effect at the time of reproduction, the video disk apparatus 1 gains access to the real data in the movie data atom to acquire the parameter associated with the active effect in question. In accordance with the effect of the entry involved, the video disk apparatus 1 processes the video data in question using the acquired parameter and outputs the processed video data.

If an extension field is found to have its identification flag set to designate a null effect at the time of reproduction, the video disk apparatus 1 stops accessing the real data in the movie data atom and outputs the video data associated with the null effect without performing any effect process on the data.

The conventionally formatted QT file has no such extension fields. Where there is no extension field, the effect types are detected and the parameters are acquired from the movie data atom in conventional fashion. The corresponding video data is processed by use of the detected effect types and acquired parameters, and the processed video data is output.

If the effect type selected by the user is an original effect unique to the video disk apparatus 1, the effect type field in the entry for the effect has the user defined effect type set therein. An owner ID and an effect ID set in the extension field designate the specific effect type.

With this embodiment, the QT format is managed flexibly so that diverse effects developed by the manufacturer may be implemented rapidly.

The extension field containing the effect name is divided into two parts of two bytes each, the two parts accommodating an owner ID and an effect ID respectively to denote the name of a uniquely defined effect. It follows that each uniquely defined effect type can be handled in self-contained fashion by the manufacturer. This prevents any duplication of codes allocated to the extension fields where operation management is concerned. In fact, if any uniquely extended effect is defined without recourse to the owner ID and effect ID, the steps to be taken to avert the duplication of four alphabetic characters between manufacturers wishing to define new effects will become inordinately complex, and so will be the control over the order in which the manufacturers are to apply for their own definitions. The video disk apparatus 1 of this invention makes effective use of the extension entries regarding null effects while allowing effect types to be defined flexibly for use.

At the time of reproduction, the video disk apparatus 1 processes video data in keeping with the effect types set in the effect type fields provided originally in the entries related to the effects. If an effect type related to a user defined effect is encountered during the process, the owner ID and effect ID are detected from the extension field. A check is made to determine whether the detected effect is executable by the apparatus. If the effect is found executable, the real data parameter is acquired and the corresponding process is carried out accordingly. If the detected effect is not found executable by the apparatus, e.g., if the effect turns out to be defined by another manufacturer and is not treatable by the apparatus, the video data might be output unmodified without use of the source track.

(3) Effects of the Embodiment

Where the embodiment of the above-described structure is in use, the effect track is made by setting null effects each representative of a disabled effect and active effects each denoting an enabled effect with regard to the video track carrying video data management information. A QT format file is then made by setting to the video track a source track serving as a target for the effect track. This embodiment reduces the burdens on the resources in editing the QT format file and reproducing the edited file.

In one example, the effects involved may be one-source effects, and there may be provided a single source track associated with such one-source effects. In this case, it is possible to perform the one-source effect process by handling two tracks, whereby the burdens on the resources in editing files and reproducing the edited files can be reduced.

In another example, the effects involved may be two-source effects, and there may be provided two source tracks associated with the two-source effects. In this case, it is possible for the inventive apparatus to carry out the two-source effect process by handling three tracks, whereby the burdens on the resources in editing files and reproducing the edited files are reduced.

In a further example, each sample description atom serving as the field in which to establish information for specifying an effect may be expanded to accommodate a flag for distinguishing a null effect from an active effect. The arrangement makes it possible for the apparatus to prevent wasteful access to the movie data atom associated with null effects and to bypass steps to process video data based on the result of such access. This provides a further reduction of the burdens on the resources in editing files and reproducing the edited files.

In an even further example, a specific effect selected by the user may be associated with a specific code set in an extension field of the information for identifying the effect type, the specific code identifying the type of the user-selected effect. That is, the effect type related to the user defined effect may be set in the effect type field originally furnished in the entry associated with the effect in question, with the specific effect type identified by the extension field. This makes it possible for the apparatus to manage the QT format flexibly so that diverse effects developed by the manufacturer may be implemented quickly.

The extended effect type may be represented by an owner ID unique to each manufacturer and by a proprietary effect code defined by the manufacturer in question. This arrangement can avert eventual troubles resulting from possible duplication of the effect type codes between manufacturers wishing to define their own effect types.

More specifically, where the file of interest is a QT format file, the extension field may be furnished in the entry associated with the corresponding effect in the sample description atom. This makes it possible for the apparatus, through simplified processing, to reduce the burdens on the resources in editing QT format files and reproducing the edited files while maintaining compatibility with conventionally formatted files.

As opposed to the above-described recording-related settings, whenever a null effect is encountered in the course of reproduction, the appropriate flag setting may be used to stop access to the real data on the effect track and to halt the effect process on the video data using the source track. This ensures a further reduction of the burdens on the resources in reproducing files.

Where the information field for identifying an effect type is loaded with a specific code for identifying the effect type, with video data processed and output by use of the corresponding real data based on the information for effect type identification, the effect type identification code established in extended fashion may be detected. If the detected code is found executable by the inventive apparatus, the video data of interest is processed according to the code and the processed data is output. If the detected code is not found executable by the apparatus, the video data is output without being processed. In this manner, even if the manufacturers establish their own effect types based on their proprietary specifications, edited files can be processed flexibly.

(4) Other Embodiments

The above-described embodiment was shown practiced by applying the present invention to a video disk apparatus that handles QT files. However, this is not limitative of the invention. Alternatively, the present invention applies extensively to recording and reproducing apparatuses which handle files having structures similar to that of the QT file, such as the QT file-based ISO Base Media file format (MPEG4-part 12), Motion JPEG2000 (MJ2) file format, and AVC (Advanced Video Coding: MPEG4-part 10) file format.

The embodiment above was indicated as the inventive video disk apparatus capable of recording the QT file to the optical disk. Alternatively, the invention may be applied to a wide range of apparatus variations for recording the file to diverse recording media including magnetic disks and memory cards.

The above embodiment was implemented by practicing the present invention as a video disk apparatus. Alternatively, the invention may be practiced as any one of diverse kinds of apparatus including camera-equipped mobile phones, PDAs (Personal Digital Assistants), servers that store pictures acquired in wired or wireless fashion, recorders for recording video data, and personal computers or like equipment capable of editing video data files of acquired pictures.

INDUSTRIAL APPLICABILITY

The present invention applies illustratively to an apparatus and related arrangements for editing QT format files of acquired pictures and for reproducing the files thus edited.

Description of Reference Numerals
1: VIDEO DISK APPARATUS
2: OPTICAL DISK
11: VIDEO ENCODER
12: AUDIO ENCODER
13A, 13B: VIDEO DECODER
14: AUDIO DECODER
15: FILE GENERATOR
15A, 17, 20: MEMORY
16: FILE DECODER
18: MEMORY CONTROLLER
19: SYSTEM CONTROL MICROCOMPUTER
21: ERROR-CORRECTING CODEC
22: DRIVE CONTROL MICROCOMPUTER
23: DATA MODEM
24: MAGNETIC FIELD MODULATION DRIVER
30: SERVO CIRCUIT
31: SPINDLE MOTOR
32: MAGNETIC HEAD
33: OPTICAL PICKUP
35: EFFECT ADDING CIRCUIT

The invention claimed is:

1. A file recording apparatus for receiving input from a user in order to edit video data and to record a file based on a result of said edit, said file comprising:
   a block comprised of management information, having at least a video track based on management information about said video data and an effect track based on management information about effects to be set for said video data in a hierarchical structure of management information for managing real data; and
   a block comprised of real data, having at least real data associated with said effect track;
   wherein said file recording apparatus makes said effect track by setting a null effect having no advantage of said effect and an active effect having an advantage of said effect with regard to said video track, and makes said file by setting a source track as a target for said effect track to said video track.

2. The file recording apparatus according to claim 1, wherein:
   said effect is a one-source effect; and
   said source track associated with said one-source effect is constituted by one track for said video track.

3. The file recording apparatus according to claim 1, wherein:
   said effect is a two-source effect; and
   said source track associated with said two-source effect is constituted by two tracks for said video track.

4. The file recording apparatus according to claim 1, wherein:
   the management information regarding said effect track identifies said effect;
   the real data associated with said effect track constitutes a parameter of said effect; and
   a flag is established by use of an extended entry of the information for identifying said effect, said flag being set to distinguish said null effect from said active effect.

5. The file recording apparatus according to claim 1, wherein:
   the management information regarding said effect track identifies a type of said effect; and
   a specific effect selected by said user is associated with a specific code set in an extension field of the information for identifying the effect type, said specific code identifying the type of the user-selected effect.

6. The file recording apparatus according to claim 5, wherein said specific code which identifies said effect type and which is set in said extension field is constituted by a code unique to a manufacturer and by a proprietary effect code defined by said manufacturer.

7. The file recording apparatus according to claim 6, wherein:
   said file is a QT format file; and
   said extension field is established in an entry associated with a corresponding effect of a sample description atom.

8. A file reproducing apparatus for reproducing a file of video data recorded on a recording medium and outputting the reproduced video data, said file comprising:
   a block comprised of management information, having at least a video track based on management information about said video data and an effect track based on management information about effects to be set for said video data in a hierarchical structure of management information for managing real data; and
   a block comprised of real data, having at least real data associated with said effect track;
   wherein said effect track is made by setting a null effect having no advantage of said effect and an active effect having an advantage of said effect with regard to said video track, and by setting a source track as a target for said effect track to said video track; and
   said file reproducing apparatus reproduces video data from said source track based on the management information set to said effect track while subjecting the reproduced video data to an effect process, and outputs the processed video data.

9. The file reproducing apparatus according to claim 8, wherein:
   the management information regarding said effect track identifies said effect;
   the real data associated with said effect track constitutes a parameter of said effect;
   a flag is established by use of an extended entry of the information for identifying said effect, said flag being set to distinguish said null effect from said active effect; and
   said file reproducing apparatus stops said effect process of the video data reproduced from said source track in accordance with the setting of said flag and outputs said video data.

10. The file reproducing apparatus according to claim 9, wherein access to the real data corresponding to said effect track is stopped in accordance with the setting of said flag.

11. The file reproducing apparatus according to claim 8, wherein:
   the management information regarding said effect track identifies a type of said effect;
   a specific effect selected by said user is associated with a specific code set in an extension field of the information for identifying the effect type, said specific code identifying the type of the user-selected effect;

based on said information for identifying said effect type, said file reproducing apparatus processes said video data using the corresponding real data and outputs the processed video data;

if said specific code is found set in said extension field of said information for identifying said effect type, then said file reproducing apparatus detects said specific code from said extension field;

if the detected code is supported by said file reproducing apparatus, then said file reproducing apparatus processes said video data in accordance with the code and outputs the processed video data; and if the detected code is not supported by said file reproducing apparatus, then said file reproducing apparatus outputs said video data without processing it.

12. A file recording method for receiving input from a user in order to edit video data and to record a file based on a result of said edit, said file including:

a block comprised of management information, having at least a video track based on management information about said video data and an effect track based on management information about effects to be set for said video data in a hierarchical structure of management information for managing real data; and a block comprised of real data, having at least real data associated with said effect track;

wherein said file recording method comprises:

making said effect track by setting a null effect having no advantage of said effect and an active effect having an advantage of said effect with regard to said video track; and making said file by setting a source track as a target for said effect track to said video track.

13. The file recording method according to claim 12, wherein:

the management information regarding said effect track identifies said effect;

the real data associated with said effect track constitutes a parameter of said effect; and a flag is established by use of an extended entry of the information for identifying said effect, said flag being set to distinguish said null effect from said active effect.

14. The file recording method according to claim 12, wherein:

the management information regarding said effect track identifies a type of said effect; and a specific effect selected by said user is associated with a specific code set in an extension field of the information for identifying the effect type, said specific code identifying the type of the user-selected effect.

15. A recording medium which records a file recording method program for causing a computer to execute a procedure for receiving input from a user in order to edit video data and to record a file based on a result of said edit, said file including:

a block comprised of management information, having at least a video track based on management information about said video data and an effect track based on management information about effects to be set for said video data in a hierarchical structure of management information for managing real data; and a block comprised of real data, having at least real data associated with said effect track;

wherein said procedure comprises:

making said effect track by setting a null effect having no advantage of said effect and an active effect having an advantage of said effect with regard to said video track; and making said file by setting a source track as a target for said effect track to said video track.

16. A file reproducing method for reproducing a file of video data recorded on a recording medium and outputting the reproduced video data, said file including:

a block comprised of management information, having at least a video track based on management information about said video data and an effect track based on management information about effects to be set for said video data in a hierarchical structure of management information for managing real data; and a block comprised of real data, having at least real data associated with said effect track;

wherein said effect track is made by setting a null effect having no advantage of said effect and an active effect having an advantage of said effect with regard to said video track, and by setting a source track as a target for said effect track to said video track, and said file reproducing method comprises:

reproducing video data from said source track based on the management information set to said effect track while subjecting the reproduced video data to an effect process; and outputting the processed video data.

17. The file reproducing method according to claim 16, wherein:

the management information regarding said effect track identifies said effect;

the real data associated with said effect track constitutes a parameter of said effect;

a flag is established by use of an extended entry of the information for identifying said effect, said flag being set to distinguish said null effect from said active effect; and said file reproducing method further comprises:

stopping reproduction of the real data corresponding to said effect track in accordance with the setting of said flag, and, outputting said reproduced video data without processing it on said null effect.

18. The file reproducing method according to claim 16, wherein:

the management information regarding said effect track identifies a type of said effect;

a specific effect selected by said user is associated with a specific code set in an extension field of the information for identifying the effect type, said specific code identifying the type of the user-selected effect;

said file reproducing method further comprises:

processing, based on said information for identifying said effect type, said video data using the corresponding real data, and outputting the processed video data;

if said specific code is found set in said extension field of said information for identifying said effect type, then said specific code is detected from said extension field;

if the detected code is supported by said file reproducing method, then said video data is processed in accordance with the code and the processed video data is output; and if the detected code is not supported by said file reproducing method, then said video data is output without being processed.

19. A recording medium which records a file reproducing method program for causing a computer to execute a procedure for reproducing a file of video data recorded on a recording medium and outputting the reproduced video data, said file including:
- a block comprised of management information, having at least a video track based on management information about said video data and an effect track based on management information about effects to be set for said video data in a hierarchical structure of management information for managing real data; and
- a block comprised of real data, having at least real data associated with said effect track;

wherein said effect track is made by setting a null effect having no advantage of said effect and an active effect having an advantage of said effect with regard to said video track, and by setting a source track as a target for said effect track to said video track, and said procedure comprises:
- reproducing video data from said source track based on the management information set to said effect track while subjecting the reproduced video data to an effect process, and
- outputting the processed video data.

* * * * *